United States Patent
Liu et al.

(10) Patent No.: US 11,450,341 B1
(45) Date of Patent: *Sep. 20, 2022

(54) THERMAL SPOT-DEPENDENT WRITE METHOD AND APPARATUS FOR A HEAT-ASSISTED MAGNETIC STORAGE DEVICE

(71) Applicant: Seagate Technology LLC, Fremont, CA (US)

(72) Inventors: Xiong Liu, Singapore (SG); Quan Li, Singapore (SG)

(73) Assignee: Seagate Technology LLC, Fremont, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/407,652

(22) Filed: Aug. 20, 2021

Related U.S. Application Data

(63) Continuation of application No. 17/141,491, filed on Jan. 5, 2021, now Pat. No. 11,127,419, which is a continuation-in-part of application No. 17/107,277, filed on Nov. 30, 2020, now Pat. No. 11,127,418, which is a continuation of application No. 16/798,739, filed on Feb. 24, 2020, now Pat. No. 10,885,932.

(51) Int. Cl.
| | | |
|---|---|---|
| *G11B 5/09* | (2006.01) | |
| *G11B 20/10* | (2006.01) | |
| *G11B 5/39* | (2006.01) | |
| *G11B 5/00* | (2006.01) | |

(52) U.S. Cl.
CPC .............. *G11B 5/09* (2013.01); *G11B 5/39* (2013.01); *G11B 20/10222* (2013.01); *G11B 2005/0018* (2013.01); *G11B 2005/0021* (2013.01)

(58) Field of Classification Search
CPC ....... G11B 5/09; G11B 5/39; G11B 20/10222; G11B 2005/0018; G11B 2005/0021; G11B 5/00; G11B 20/10037; G11B 20/1217; G11B 201/0009; G11B 5/6047
USPC .................. 360/75; 369/59.11, 59.12, 59.13
See application file for complete search history.

(56) References Cited

U.S. PATENT DOCUMENTS

| | | |
|---|---|---|
| 5,721,856 A | 2/1998 | Takeuchi |
| 6,466,386 B1 | 10/2002 | Dakroub |
| 6,798,591 B2 | 9/2004 | Barnett et al. |
| 6,879,455 B2 | 4/2005 | Ngo et al. |
| 7,035,028 B2 | 4/2006 | Venca et al. |
| 7,117,817 B2 | 10/2006 | Overstreet |
| 7,206,155 B2 | 4/2007 | Kuehlwein et al. |
| 7,242,544 B2 | 7/2007 | Price, Jr. et al. |

(Continued)

*Primary Examiner* — Nabil Z Hindi
(74) *Attorney, Agent, or Firm* — Mueting Raasch Group

(57) ABSTRACT

An apparatus comprises a write pole for writing data to a magnetic recording medium and a near-field transducer (NFT) optically coupled to a laser source and configured to produce a thermal spot on the medium. A laser driver applies laser operation power (Iop) to the laser source. A channel circuit generates symbols having a length of nT, where T is a channel clock rate and n is an integer. The laser driver applies Iop to the laser source and a write driver applies bi-directional write currents to the write pole to record the symbols at a location of the thermal spot on the medium, wherein a duration of applying Iop to the laser source by the laser driver is dependent on a length of the symbols and the effective thermal spot size.

20 Claims, 17 Drawing Sheets

(56) References Cited

U.S. PATENT DOCUMENTS

| | | |
|---|---|---|
| 7,290,184 B2 | 10/2007 | Bruner et al. |
| 7,417,817 B1 | 8/2008 | Aram et al. |
| 8,159,769 B2 | 4/2012 | Batra et al. |
| 8,385,157 B1 | 2/2013 | Champion et al. |
| 8,486,286 B1 | 7/2013 | Gao et al. |
| 8,804,261 B2 | 8/2014 | Mazur et al. |
| 9,715,887 B2 | 7/2017 | Wilson et al. |
| 9,905,251 B2 | 2/2018 | Liu et al. |
| 10,115,415 B1 | 10/2018 | Tang et al. |
| 10,192,580 B1 * | 1/2019 | Liu .................... G11B 5/09 |
| 10,403,308 B2 | 9/2019 | Koizumi et al. |
| 10,446,184 B1 | 10/2019 | Liu et al. |
| 2012/0019947 A1 | 1/2012 | Kuehlwein et al. |
| 2018/0005650 A1 | 1/2018 | Tanner et al. |

\* cited by examiner

US 11,450,341 B1

THERMAL SPOT-DEPENDENT WRITE METHOD AND APPARATUS FOR A HEAT-ASSISTED MAGNETIC STORAGE DEVICE

RELATED APPLICATIONS

This application is a continuation of U.S. patent application Ser. No. 17/141,491 filed Jan. 5, 2021, which is a continuation-in-part of U.S. patent application Ser. No. 17/107,277, filed Nov. 30, 2020, which is a continuation of U.S. patent application Ser. No. 16/798,739, filed Feb. 24, 2020, now U.S. Pat. No. 10,885,932, which are incorporated herein by reference in their entireties.

SUMMARY

Embodiments are directed to a method comprising generating symbols to describe a set of write data, the symbols having a length of nT, where T is a channel clock rate and n is an integer. The method also comprises producing a thermal spot on a magnetic storage medium using a near-field transducer situated proximate a write pole and optically coupled to a laser source, the near-field transducer associated with an effective thermal spot size having a downtrack bit length of mT, where m is an integer. The method further comprises applying laser operation power (Iop) to the laser source and applying bi-directional write currents to the write pole to record the symbols at a location of the thermal spot on the medium, wherein a duration of applying Iop to the laser source is dependent on a length of the symbols and the effective thermal spot size.

Embodiments are directed to an apparatus comprising a write pole positionable adjacent a magnetic recording medium and configured to write data to the medium, and a near-field transducer optically coupled to a laser source. The near-field transducer is situated proximate the write pole and configured to produce a thermal spot on the medium. The near-field transducer is associated with an effective thermal spot size having a downtrack bit length of mT, where m is an integer. A laser driver is configured to apply laser operation power (Iop) to the laser source. A channel circuit is configured to generate symbols having a length of nT, where T is a channel clock rate and n is an integer. A write driver is configured to apply bi-directional write currents to the write pole. The laser driver is configured to apply Iop to the laser source and the write driver is configured to apply bi-directional write currents to the write pole to record the symbols at a location of the thermal spot on the medium, wherein a duration of applying Iop to the laser source by the laser driver is dependent on a length of the symbols and the effective thermal spot size.

The above summary is not intended to describe each embodiment or every implementation. A more complete understanding will become apparent and appreciated by referring to the following detailed description and claims in conjunction with the accompanying drawings.

BRIEF DESCRIPTION OF THE DRAWINGS

The figures are not necessarily to scale. Like numbers used in the figures refer to like components. However, it will be understood that the use of a number to refer to a component in a given figure is not intended to limit the component in another figure labeled with the same number.

DETAILED DESCRIPTION

The present disclosure generally relates to writing data to devices configured for heat-assisted magnetic recording or HAMR. This technology, also referred to as energy-assisted magnetic recording (EAMR), thermally-assisted magnetic recording (TAMR), and thermally-assisted recording (TAR), uses an energy source such as a laser and a near-field transducer to heat a small spot (referred to herein as a "thermal spot") on a magnetic disc during recording. The heat lowers magnetic coercivity at the thermal spot, allowing a write transducer to change magnetic orientation. Due to the relatively high coercivity of the medium after cooling, the data is less susceptible to superparamagnetic effects that can lead to data errors.

Figure 1:
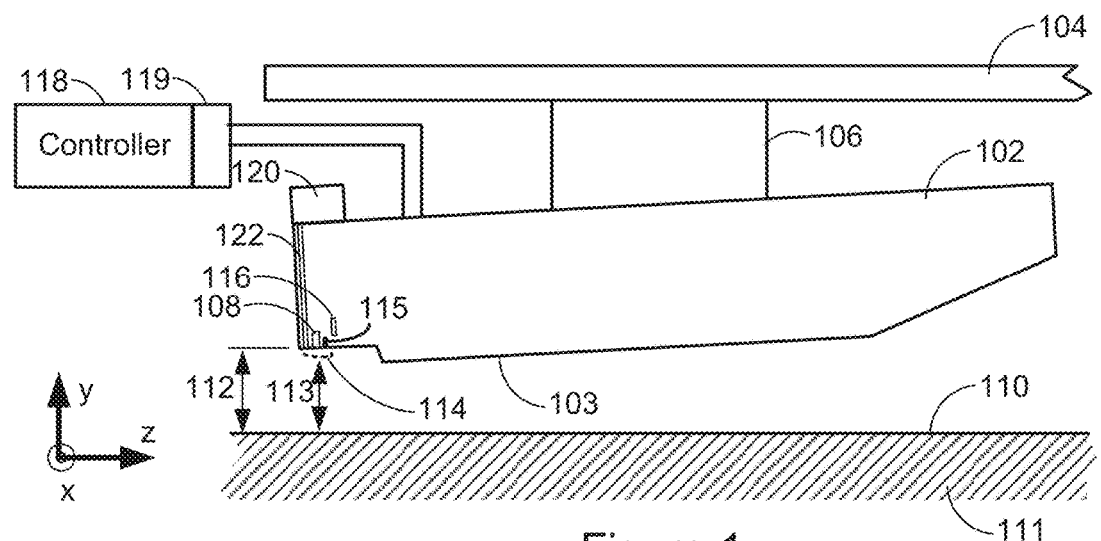
FIG. 1 is a block diagram of a heat-assisted magnetic recording (HAMR) head and media arrangement according to various embodiments described herein.

With reference now to FIG. 1, a block diagram shows a side view of a slider 102 according to a representative embodiment. The slider 102 may also be referred to as a recording head, read head, read/write head, head, etc. The slider 102 is coupled to a loadbeam 104 by way of a dimple 106 that allows some relative motion between the slider 102 and loadbeam 104. The slider 102 includes read/write transducers 108 at a trailing edge that are held proximate to a surface 110 of a magnetic recording medium 111, e.g., magnetic disc. When the slider 102 is located over surface 110 of recording medium 111, a flying height 112 is maintained between the slider 102 and the surface 110 by a downward force of loadbeam 104. This downward force is counterbalanced by an air cushion that exists between the surface 110 and an air bearing surface (ABS) 103 (also referred to as a "media-facing surface") of the slider 102 when the recording medium 111 is rotating. A thermal sensor 115 is shown situated at or near the close point 114 (e.g., adjacent the read/write transducers 108, such as near the NFT) or can be positioned at other locations of the ABS 103. The thermal sensor 115 can be configured for measuring temperature at or near the NFT and/or sensing temperature changes due to changes in slider fly height and head-to-medium contact, for example.

It is desirable to maintain a predetermined slider flying height 112 over a range of drive operating conditions (e.g., different rotational speeds, temperatures, humidities, etc.) during both reading and writing operations to ensure consistent performance. Region 114 is a "close point" of the slider 102, which is generally understood to be the closest point of contact between the read/write transducers 108 and the magnetic recording medium 111, and generally defines the head-to-media spacing 113. To account for both static and dynamic variations that may affect slider flying height 112, the slider 102 may be configured such that a region 114 of the slider 102 can be configurably adjusted during operation in order to finely adjust the head-to-media spacing 113. This is shown in FIG. 1 by dotted line that represents a change in geometry of the region 114. In this example, the geometry change may be induced, in whole or in part, by an increase or decrease in temperature of the region 114. To provide this type of control over dynamic/effective head-to-media spacing 113 via heat, the slider 102 may include (or otherwise be thermally coupled to) one or more heating elements 116. These heating elements 116 (e.g., resistance heaters) may be provided with selectable amounts of current by a controller 118.

Generally, the controller 118 at least includes logic circuitry for controlling the functions of an apparatus that includes at least the slider 102 and recording medium 111, and may include other components not shown, such as spindle motor, arm actuator, power supplies, etc. The controller 118 may include or be coupled to interface circuitry 119 such as preamplifiers, buffers, filters, digital-to-analog converters, analog-to-digital converters, etc., that facilitate electrically coupling the logic of the controller 118 to the analog signals used by the slider 102 and other components not shown.

Figure 2:
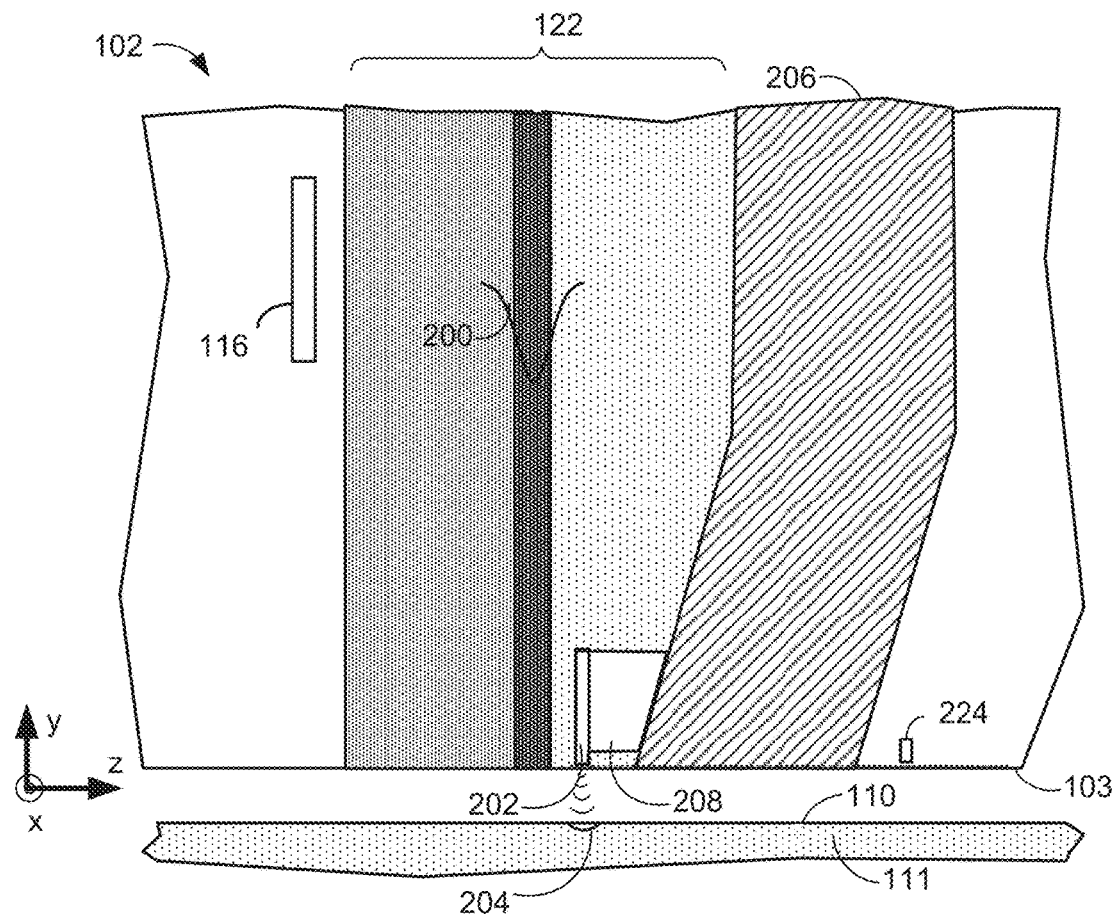
FIG. 2 is a cross-sectional view of a HAMR head according to various embodiments described herein.

In FIG. 2, a block diagram illustrates a cross-sectional view of the slider 102 according to a representative embodiment. An optical waveguide 122 receives electromagnetic energy 200 from an energy source (e.g., a laser source), the energy being coupled to an NFT 202. The NFT 202 is made of a metal (e.g., gold, silver, copper, etc.) that achieves surface plasmonic resonance in response to the applied energy 200. The NFT 202 shapes and transmits the energy to create a small thermal spot 204 on the surface 110 of medium 111. A magnetic write pole 206 causes changes in magnetic flux near the media-facing surface 103 in response to an applied write current. Flux from the write pole 206 changes a magnetic orientation of the thermal spot 204 as it moves past the write pole 206 in the downtrack direction (z-direction).

The slider 102 additionally includes the heating element (heater) 116 that may be used to adjust the protrusion of the write pole 206/NFT 202, a read transducer (not shown) and a sensor 224. A writer heater may be situated proximate a writer of the slider 102, and a reader heater may be situated proximate a reader of the slider 102. The sensor 224 may be used for various purposes, such as head-to-medium spacing measurements and contact detection. The sensor 224 may be a temperature coefficient of resistance (TCR) type sensor, for example, a dual-ended TCR (DETCR). The slider 102 further includes a heat sink 208 that is thermally coupled to the NFT 202. The heat sink 208 may be used to draw heat away, e.g., to the write pole 206 or other nearby heat-conductive components, as the heat at the thermal spot 204 increases.

Data storage devices configured for heat-assisted magnetic recording store and retrieve data from a host device in a fast and efficient manner. Some data storage devices employ rotatable recording media (discs) which are rotated at a high rotational velocity. One or more data transducers (heads) are movably positioned adjacent tracks defined on the disc surfaces to write and read data to and from the media. The data are often written in the form of symbols of nT bit length, where T is a channel clock rate and n is an integer over a selected range. For example, 1T refers to 1 bit of a particular polarity, 2T refers to 2 bits with the same polarity, 3T refers to 3 bits with the same polarity, and so on. The range for the value n can vary depending on the requirements of a given storage device environment. Representative ranges can include symbol lengths of from 1T to 8T, 3T to 16T, etc.

In magnetic recording discs, bi-directional write currents are supplied to a write coil to write the symbol sequence to the medium, with magnetic flux transitions (reversals) being supplied at each symbol boundary. The magnetic flux transitions are interpreted as a first logical value (e.g., logical 1), and a second logical value (e.g., logical 0) is assigned to each of the channel bits between adjacent symbol boundaries.

Run length limited (RLL) encoding (e.g. 8/9, 16/17, etc.) is applied to establish the available symbol set by incorporating rules with regard to how closely spaced and how far apart the symbol boundaries (e.g., logical 1s) can be located in the recorded sequence. For example, a symbol set with a minimum symbol length of 1T allows transitions (logical 1s) to be immediately adjacent one another with no intervening logical 0s therebetween (e.g., the sequence "11" can be written to the medium). By contrast, a symbol set with a minimum symbol length of 2T requires at least two (2) logical 0s be present between successive logical 1s (e.g., 1001 is the closest two logical 1s can appear on the medium). A symbol set with a maximum symbol size of 8T allows no more than eight (8) logical 0s between successive logical is (e.g., 100000001 is the maximum distance between logical 1s), and so on.

In general, the data storage density along a track is determined by the media (e.g., magnetic grain size) and the head (e.g., writer, reader, size of hot spot); the smaller the media grain size and head size, the higher the density. The channel clock rate T must increase accordingly to achieve or realize the storage density. The channel clock rate T needs to be increased when using a higher write frequency clock and/or rotating the medium at a higher rotational velocity. Generally, a higher channel clock rate T provides a shorter amount of elapsed time between successive transitions on the medium as the medium rotates adjacent the associated transducer.

There will generally be an upper limit to how short the smallest symbols in the symbol set can be from an elapsed time and distance standpoint. For example, the use of extremely short symbols in the symbol set, such as 1T symbols, can provide degradation in the reliability of the write operation if there is insufficient time for the write driver to obtain a full reversal of the write current through the coil during the period of time that the 1T (or other short length) symbol is being written. Stated another way, the shortest symbols in the set may not be "long" enough from a time or distance standpoint to enable the system to adequately magnetize the medium and store the desired magnetization pattern with sufficient strength to ensure reliable recovery during a subsequent read operation. Using a reduced frequency channel clock rate T to accommodate short symbol writes may tend to increase adjacent track interference and serve as an upper limit on achievable TPI densities. The foregoing limitations are not limited to magnetic recording, but can arise in other data recording systems as well such as optical data recording systems that rely on changes in optical detection levels to mark symbol boundaries.

Figure 3:
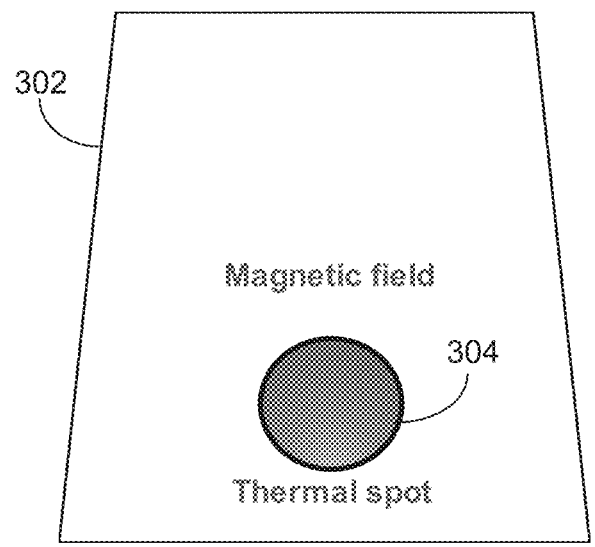
FIG. 3 illustrates the size and shape of the effective footprint of a write pole of a magnetic writer of a HAMR slider in relation to a thermal spot generated on the surface of a magnetic recording medium by a near-field transducer (NFT) of the HAMR slider in accordance with various embodiments.

It is noted that, in prior work, the inventors developed a writing operation based on the magnetic footprint of the writer. However, a writer magnetic footprint-based writing operation is not suitable for HAMR drive systems. FIG. 3 illustrates the size and shape of the effective footprint 302 of a write pole of a magnetic writer of a HAMR slider in relation to a thermal spot 304 generated on the surface of a magnetic recording medium by the NFT of the HAMR slider. The NFT and/or thermal spot 304 defines the track width, while the write pole merely provides the background field. As is evident in the illustration shown in FIG. 3, the writer magnetic footprint 302 is much wider and longer than the media thermal spot 304. As such, it can be appreciated that writer magnetic footprint is not as critical to HAMR writer operation as is the size of the media thermal spot 304.

Figure 4:
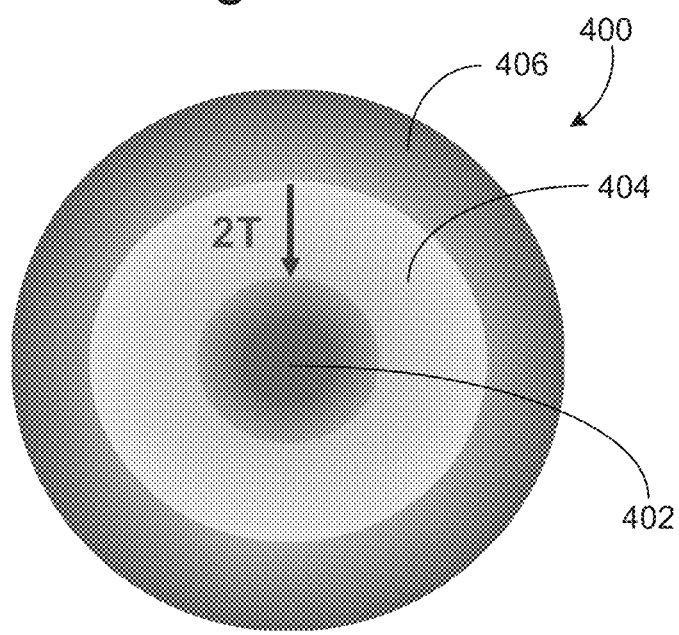
FIG. 4 illustrates a region of a magnetic recording medium subject to HAMR for purposes of illustration.

FIG. 4 illustrates a region 400 of a magnetic recording medium subject to HAMR for purposes of illustration. It is assumed that the region 400 of the medium has been heated by an NFT of a HAMR slider during a HAMR write operation. The inner region 402 represents a region that is too hot to facilitate reliable recording of data. The middle region 404 represents the effective thermal spot size (ETSS). The width or diameter of the ETSS determines the completed switched media area. For example, if the ETSS is larger than a bit length of 2T and a 2T symbol pattern is to be written, then write current need only be applied to the write pole for the $1^{st}$ T of the 2T symbol. If the ETSS is larger than a bit length of 3T and a 2T or a 3T symbol pattern is to be written, then write current need only be applied to the write pole for the $1^{st}$ T of the 2T or 3T symbol. If the ETSS is larger than a bit length of 4T and a 2T, a 3T or a 4T symbol pattern is to be written, then write current need only be applied to the write pole for the $1^{st}$ T of the 2T, 3T or 4T symbol, and so on.

Figure 5B:
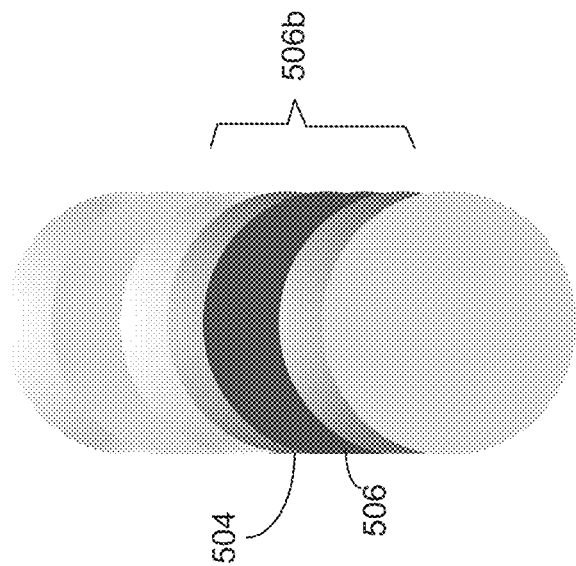
FIGS. 5A and 5B illustrate the size of a representative thermal spot produced by an NFT of a HAMR slider relative to the size of a number of bits of a magnetic recording medium in accordance with various embodiments.
Figure 5A:
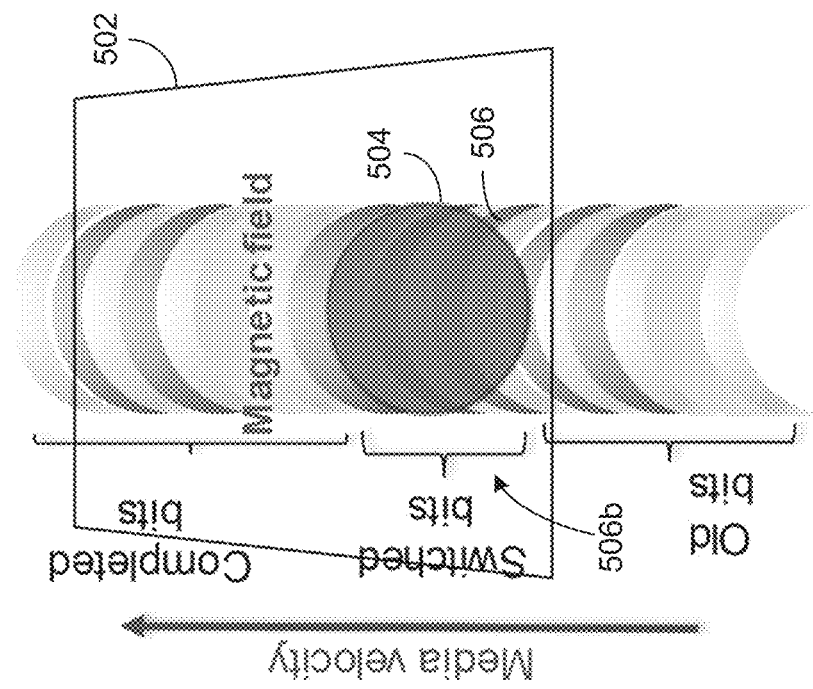

In general, and with reference now to FIGS. 5A and 5B, the thermal spot 504 produced by a NFT of a HAMR slider is longer in the downtrack direction than the downtrack length of a few bits 506 of a magnetic recording medium. As will be recognized, a bit (e.g., bit 506) may include many magnetic grains in the recording layer. A switched or completed bit is one in which all of the grains have been completely switched from positive to negative or negative to positive. An incomplete bit is one in which not all of the grains have been completely switched from positive to negative or negative to positive.

In the illustrative example shown in FIGS. 5A and 5B, the thermal spot 504 has a size which is about 3 to 4 times longer than a bit 506 in the downtrack direction. Assuming, for example, that 4 bits are switched properly (shown as switched bits 506b) during a HAMR writing operation, the thermal spot 504 is said to have an effective thermal spot size of 4 bits, which corresponds to an effective thermal spot size of 4T.

Embodiments of the disclosure are directed to measuring the effective thermal spot size associated with an NFT of a HAMR slider in terms of number of bits or symbol length, T. The duration of write current applied to the write pole of the HAMR slider's writer is based on the measured ETSS and data length, T, of the symbol pattern to be written.

Accordingly, embodiments of the present disclosure are generally directed to a method and apparatus for writing data to a recording medium configured for heat-assisted magnetic recording using an effective thermal spot size associated with a near-field transducer of a HAMR writer. Various embodiments are directed to measuring an effective thermal spot size associated with a near-field transducer of a HAMR writer. Various embodiments are directed to applying write currents to a write pole according to both the data pattern to be written and the effective thermal spot size. Applying write currents to a write pole according to both the data pattern to be written and the effective thermal spot size advantageously reduces the risk of adjacent track and down-track erasure, shortens magnetic rise-time, and reduces power consumption when writing relatively long data patterns (e.g., symbols having a length >5T or 6T).

As explained below, various embodiments provide a write driver circuit that supplies bi-directional write currents to a write pole, such as but not limited to a magnetic coil. Data are written in the form of a sequence of nT symbols over a selected range, where T is a channel clock rate and n is an integer such as from a minimum value for n=X to a maximum value for n=Y. Alternating symbols are written using opposing rail currents of selected respective magnitudes.

For symbols having a length >1T, an intermediate current value (e.g., 0 mA) between the two rail current magnitudes can be applied to the write pole for one or more channel clock periods prior to the next transition (symbol boundary). The number of channel clock periods during which the intermediate current value is applied is based on the length of the symbol and the effective thermal spot size associated with the NFT. The intermediate current can be a zero current or a relatively small current. In this way, the current switching time to initiate the writing of the next symbol can be reduced. This can be achieved in a variety of ways, such as by adding a zero status to the data stream or temporarily disabling the write current at the end of each symbol.

As discussed previously, the effective size of the thermal spot produced by the NFT corresponds to the number of bits that are concurrently magnetized to the desired magnetization orientation at a location of the thermal spot when a write current is applied to the write pole. For example, an NFT associated with an effective thermal spot size of 3T will concurrently magnetize 3 bits to the desired magnetization orientation when a write current is applied to the write pole.

The effective thermal spot size and the length of the symbol to be written are used to determine when and how long the write current is to be applied to the write pole. According to some embodiments, and as described in detail hereinbelow, the effective thermal spot size is measured in terms of downtrack bit length, expressed in terms of a downtrack length of mT symbol bits, where m is an integer. For example, the effective thermal spot size for a typical NFT can be 2T, 3T, 4T or 5T long, for example. It will be understood that the effective thermal spot size can be smaller or larger than this representative range. As will be discussed below, the size of the effective thermal spot will vary from NFT to NFT (e.g., head to head). Moreover, the size of the effective thermal spot will vary across the stroke as a function of radius between the outer diameter (OD) and the inner diameter (ID) of the disc.

In accordance with various embodiments, the timing and duration of write currents applied to the write pole when writing data patterns of varying length can be implemented as follows:

Length of 1T: apply write current using a first write scheme

Length of 2T to the ETSS: apply write current using a second write scheme

Length >ETSS: apply write current using a third write scheme

As can be seen above, different writing schemes are implemented based on the relationship between the length of the data pattern to be written and the effective thermal spot size.

According to some embodiments, the following writing schemes can be implemented based on the effective thermal spot size and the length T of the data pattern to be written. For a 1T data pattern, the first scheme involves applying a write current for the $1^{st}$ T. For a data pattern having a length from 2T to the ETSS, a write current is applied only for the $1^{st}$ T. No current (or an intermediate current) is applied after the $1^{st}$ T for a data pattern having a length from 2T to the ETSS. For a data pattern having a length >ETSS, the ETSS is used as an interval for applying write currents, details of which are provided hereinbelow. In general terms, for a data pattern having a length >ETSS, no current (or an intermediate current) is applied for the last m-1 bits of the data pattern, where mT represents the effective thermal spot size.

While it is contemplated that the rail current magnitudes will be equal and opposite values, such as nominally ±25 milliamps, mA, such is not required. Depending on the type of medium and the write characteristics of the write pole, the rail current magnitudes can be any suitable values including values with different magnitudes (e.g., +30 mA and −20 mA). Similarly, while a zero current value can be used for the intermediate level, other values of relatively small current can be applied, including intermediate values that are selected based on factors such as the size of a given symbol and/or the direction of the switching current.

It has been found by the inventors that write power wave shaping using the effective thermal spot size and intermediate current values in accordance with various embodiments disclosed herein can provide a substantial reduction of adjacent track and downtrack erasure effects, magnetic risetime, and power consumption. Adjacent track erasure, for example, generally involves the partial erasure of the data stored on an adjacent track. Adjacent track erasure arises due to the application of write current to a target track; the larger the write current, generally the wider the adjacent track erasure, and the longer the write current is applied, generally the wider the adjacent track erasure. Since zero or small current is applied to the writing of some bits according to various embodiments, the adjacent track erasure can be reduced. This in turn allows further reductions in track pitch and higher TPI values.

Figure 6A:
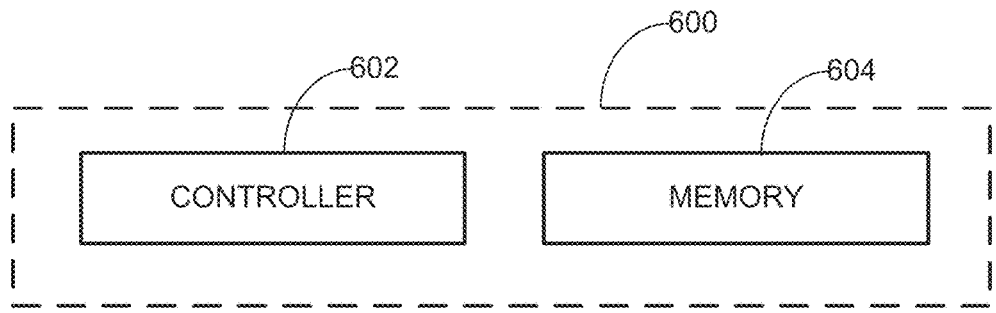
FIG. 6A is a simplified functional block diagram of a HAMR data storage device configured and operated in accordance with various embodiments of the present disclosure.

These and other features of various embodiments of the present disclosure can be appreciated with a review of FIGS. 6A-6E. FIG. 6A is a simplified representation of a HAMR data storage device 600 of the type used to store and retrieve user data from a host device. The device 600 includes a controller (control circuit) 602 and a memory module 604. The controller 602 provides top level communication and control functions as the device interfaces with the host device. Data from the host device is transferred for storage in the memory 604.

In some cases, the controller 602 can take the form of a hardware or programmable processor with associated programming in a memory location to carry out the requisite control functions. The memory 604 can take any number of configurations to provide non-volatile storage of data, including but not limited to magnetic recording discs configured for HAMR, optical recording discs, etc. The memory 604 may include circuitry in the form of channel electronics, preamplifier/driver stages, spindle and actuation motors, etc.

Figure 6B:
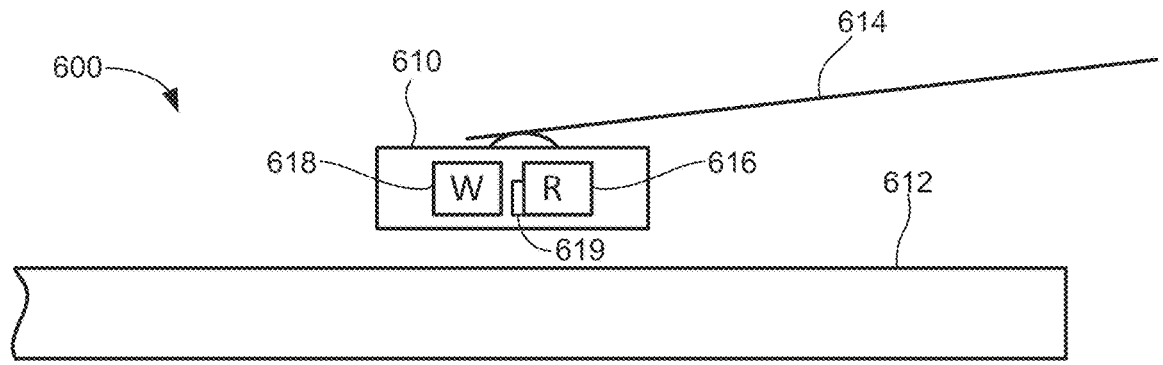
FIG. 6B shows a HAMR data transducer adjacent a data recording medium in accordance with some embodiments of the data storage device of FIG. 6A.

FIG. 6B shows an elevational representation of a data transducer 610 of the data storage device 600 of FIG. 1 in accordance with some embodiments. In FIG. 6B, the storage device 600 is characterized as a hard disc drive (HDD) configured for HAMR, although such is merely for purposes of providing a concrete example and is not limiting. The techniques disclosed herein are applicable to a wide variety of data storage devices configured for HAMR, including hybrid drives (e.g., HAMR plus SSD) for example.

The data transducer 610 is controllably positioned adjacent a magnetic recording medium (disc) 612 using a flexible suspension (flexure) member 614. In some cases, an air bearing surface (ABS) may be formed on a slider portion of the transducer 610 to maintain stable aerodynamic flight of the transducer 610 using fluidic atmospheric currents established by the high speed rotation of the disc 612.

The data transducer 610 (also referred to as a "head") includes a number of operative elements including a read (R) element 616, a write (W) element 618 (also referred to as a write pole), and an NFT 619 situated proximate the write pole 618. The read element 616 may take the form of a magnetoresistive (MR) sensor, and the write pole 618 may take the form of a perpendicular magnetic writing coil. Other forms for these elements can be used as desired. Additional operative elements can be incorporated into the transducer 610 such as a fly height adjustment (FHA) mechanism, contact sensors, etc.

Figure 6C:
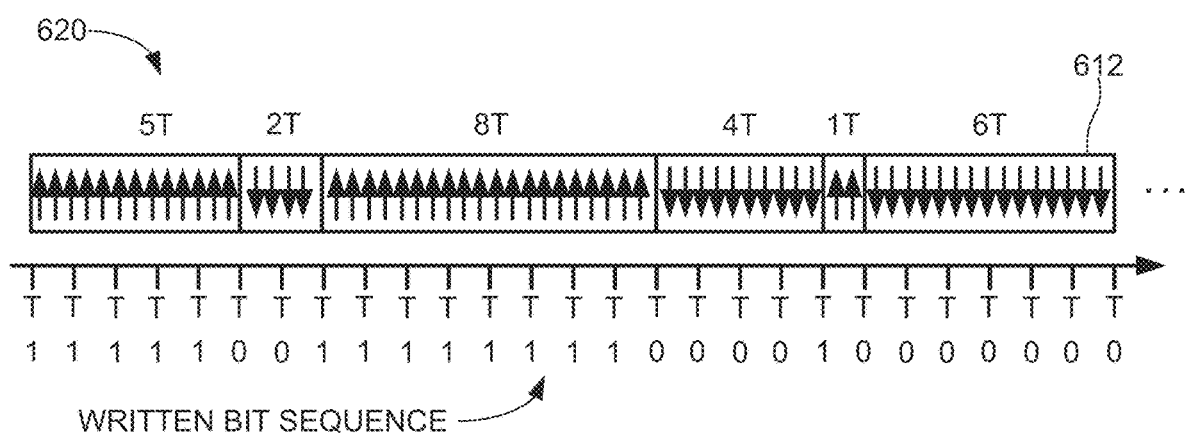
FIG. 6C shows a representative magnetization pattern for the medium of FIG. 6B.

FIG. 6C shows a representative magnetization pattern 620 that is written by the write pole 618 to a recording layer of the medium 612 during a write operation. A perpendicular magnetic recording pattern is shown, although such is merely exemplary and is not limiting. The perpendicular magnetization direction is vertical, or perpendicular, to the top surface of the medium 612, and constitutes a sequence of symbols of alternating magnetic orientation.

The pattern 620 is written as a sequence of symbols with lengths nT where T is a channel clock rate at a selected frequency and n is an integer which ranges over a selected interval set from a minimum value X to a maximum value Y. For purposes of the present discussion, the encoding scheme is contemplated as providing symbols of from 1T to 8T in length. Other encoding schemes can be used. FIG. 6C shows an exemplary symbol sequence of 5T, 2T, 8T, 4T, 1T and 6T symbols that have been written to the medium 612. For the pattern 620, the 5T symbol is interpreted as the bit pattern 11111, the 2T symbol is interpreted as the bit pattern 00, and so on. The number of arrows representing each symbol is not significant other than to denote an exemplary magnetic orientation for that particular region of the medium 612.

Figure 6D:
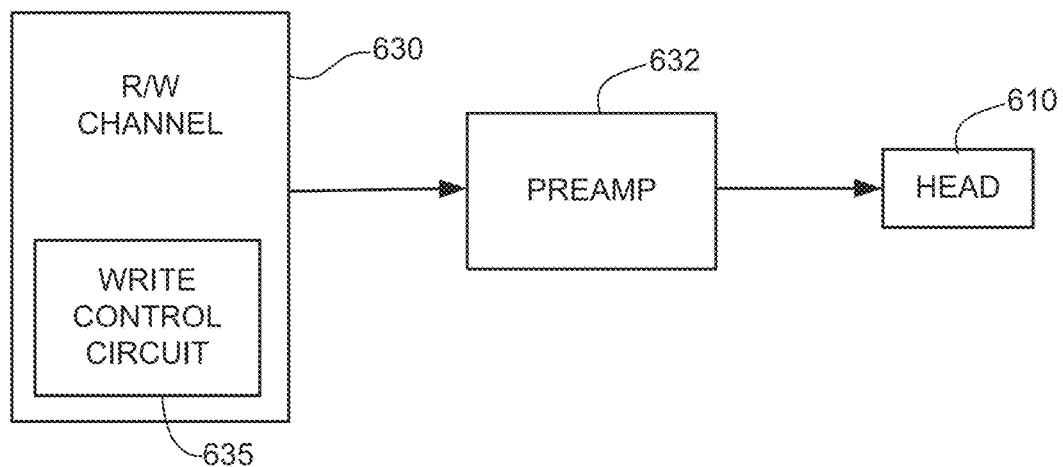
FIG. 6D is a functional block diagram of the data transducer (head) from FIG. 6B in conjunction with a read/write (R/W) channel and a preamplifier/driver (preamp) circuit of a representative HAMR data storage device in accordance with various embodiments.

FIG. 6D shows the transducer (head) 610 of FIG. 6B in conjunction with a read/write (R/W) channel circuit 630 and a preamplifier/driver circuit (preamp) 632. The channel 630 can be realized in a number of different hardware or programmable processor configurations, including SOC (system on chip) integrated circuit devices, programmable devices that use programming in memory to execute program steps, state machines, hardwired logic gates, transistors, etc. Regardless of form, the channel circuit includes encoding circuitry used during write operations to transition input write data to a sequence of symbols. The channel 630 further includes decoding circuitry used during read operations that reconstructs the originally written data from a recovered bit sequence corresponding to the originally written symbols. The preamp 632 includes write driver and read amplification and conditioning circuitry to interface with the transducer 610.

During a read operation, a readback signal is generated by the read sensor 616 (FIG. 6B). The pulses are used to adjust a variable clock oscillator (VCO) or similar circuit in the channel 630 to establish a readback clock that provides search windows at each T interval. In this way, the bit sequence shown in FIG. 6C can be recovered by the channel and decoded to provide the originally stored user data sequence.

Figure 6E:
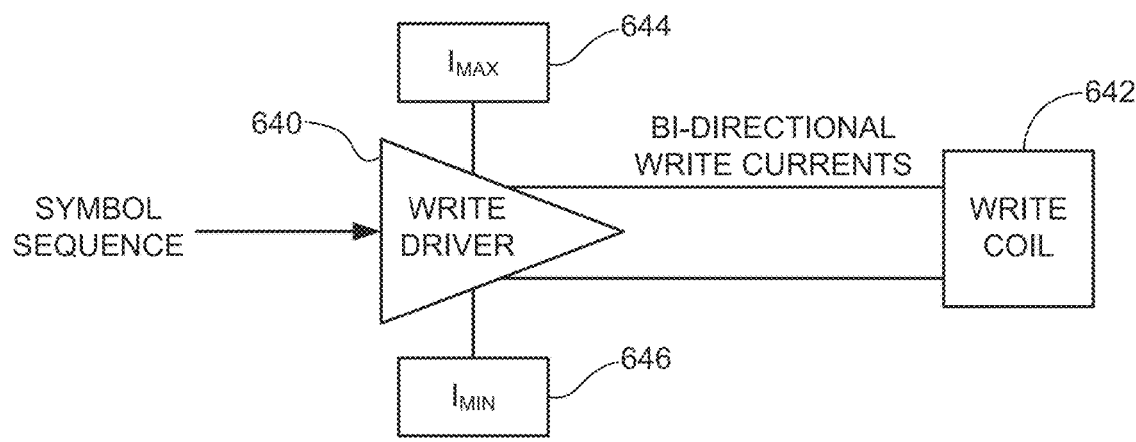
FIG. 6E shows a write driver circuit of the preamp illustrated in FIG. 6D in accordance with various embodiments.

FIG. 6E shows a write driver circuit 640 of the preamp 632 of FIG. 6D. The write driver circuit 640 can take any number of suitable forms, including an H-bridge circuit made up of power MOSFETs (metal oxide semiconductor field effect transistors) connected in an H-configuration, an operational amplifier circuit, a digital to analog converter (DAC) circuit, etc. Responsive to an input symbol sequence, the write driver 640 supplies bi-directional write currents to a write coil 642 of the write pole 618 (FIG. 6B) to write magnetization patterns such as represented in FIG. 6C. Except as modified below, the write currents nominally switch direction at each symbol boundary between a maximum rail current $I_{MAX}$ from current source 644 and a minimum rail current $I_{MIN}$ from current source 646. The rail currents can vary, but exemplary values may be ±25 milliamps, mA, etc. Any suitable current values can be used, including asymmetric values (e.g., +30 mA and −20 mA). Intermediate currents, such as zero currents, can be generated as a current between the maximum $I_{MAX}$ and minimum $I_{MIN}$ rail currents.

Rail voltage sources can be used by the write driver 640 in lieu of the current sources represented in FIG. 6E, but write currents will still be applied through the write coil 642 to effect the desired magnetization fields to magnetize the medium. Therefore, the present discussion will describe the write driver 640 in terms of applied write currents. This applies to other forms of write poles as well since even if voltages are applied, currents will flow through the write pole.

Embodiments of the disclosure are directed to determining the effective thermal spot size associated with the NFT of a HAMR writer. For example, the effective size of the thermal spot 504 shown in FIGS. 5A and 5B may be determined to be 3T or 4T in length. Determining the effective thermal spot size is important, since writing data patterns to the media is based on both the length of the data pattern and the effective thermal spot size according to embodiments of the disclosure. In contrast, when writing data patterns to a data track using a conventional approach, the write current is applied continuously over the length of the data pattern. For example, to write a 7T data pattern using a conventional approach, the write current is applied seven times longer than when writing a 1T data pattern. This conventional writing approach has a number of drawbacks, including high adjacent track and downtrack erasure, longer magnetic rise-time, and high power consumption.

From FIGS. 5A and 5B, it can be seen that the size of the effective thermal spot 504 produced by the NFT of a HAMR writer is such that multiple bits (e.g., the switched bits 506b) are switched concurrently. Assuming an ETSS 504 of 4T (or 4 bits), for example, switching the first bit at the trailing edge of the ETSS 504 causes concurrent switching of the next 3 bits. As such, according to this illustrative example, a write current need only be applied at the $1^{st}$ T symbol of a 1T, 2T, 3T, or 4T data pattern rather than being applied for each T of these data patterns. Accordingly, in this illustrative example, the arrangement of FIGS. 5A and 5B may allow an intermediate value of current to be applied for up to three clock periods (3 bits 506) prior to each transition on the basis that these bits will have already been magnetized to the correct magnetization orientation. For symbol lengths longer the ETSS 504, such as a 6T or an 8T symbol, the ETSS 504 is used as an interval for applying one or more additional write currents. Such longer symbol lengths can also have one or more intermediate bits 506 with the intermediate current value (e.g., 0 mA) since these bits will also have been already magnetized to the correct orientation. Using the effective thermal spot size as an interval and intermediate current values during the writing of relatively longer symbols provides a number of beneficial effects, including reduced power and heat dissipation, reduced coil saturation, minimized adjacent track erasure, minimized downtrack erasure, etc.

Figure 7:
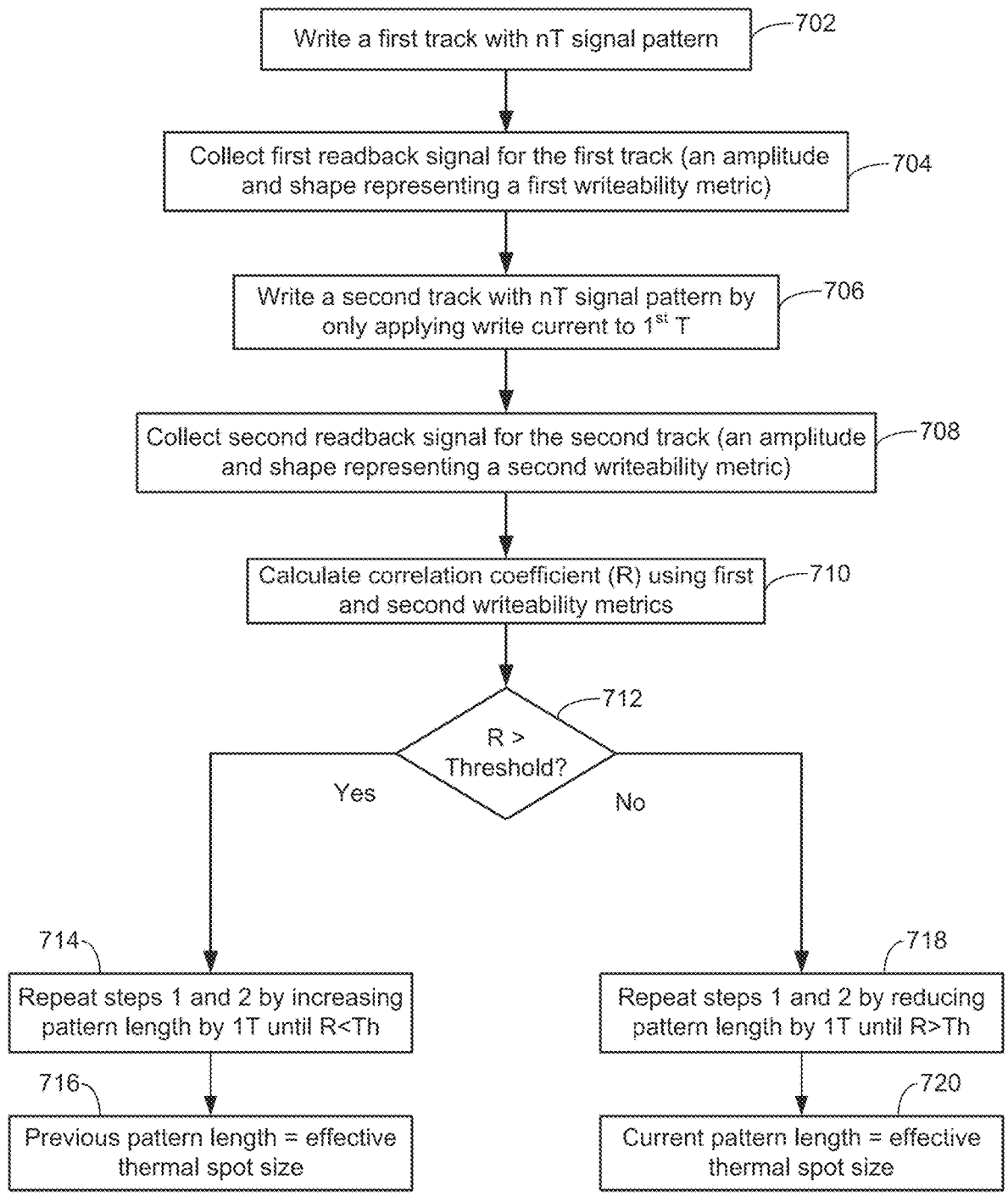
FIG. 7 illustrates a method for measuring the effective size of a thermal spot produced by an NFT of a HAMR writer in accordance with various embodiments.

FIG. 7 illustrates a method for measuring the effective thermal spot size associated with an NFT of a HAMR slider accordance with various embodiments. The method shown in FIG. 7 involves writing 702 a signal pattern having a length of nT to a first track of a magnetic storage disc, where n is an integer and the write current is continuously applied. In some approaches, the length of the signal pattern can be lower than or greater than the expected length of the effective thermal spot size. For example, it may be known in the factory that an NFT of a particular HAMR head design has an effective thermal spot size that generally varies between 3T and 4T. As such, the signal pattern of block 702 can have a length of 2T or, alternatively, a length of 5T or 6T. In other approaches, the length of the signal pattern used in block 702 can be the same as the expected effective thermal spot size (e.g., 3T) of a given HAMR head design.

It is noted that, in general, the expected effective thermal spot size for HAMR is around 3T. As such, 3T can be considered the best starting point for measuring expected effective thermal spot size. It is further noted that, for conventional HDDs, the effective writer magnetic footprint is around 6T.

The method involves collecting 704 a first readback signal from the first track, which is preferably converted from analog form to digital form. The amplitude and shape of the first readback signal represents a first writeability metric. The method shown in FIG. 7 also involves writing 706 a second track of the magnetic storage disc with the same nT signal pattern (same length as in blocks 702, 704) by only applying write current to the $1^{st}$ T. No write current is applied after the $1^{st}$ T. The method further involves collecting 708 a second readback signal from the second track, which is preferably converted from analog form to digital form. The amplitude and shape of the second readback signal represents a second writeability metric.

The method involves calculating 710 a correlation coefficient (R) using the first and second writeability metrics. It is noted that if both the amplitude and shape of the first and second readback signals are the same, then the signal pattern written to the first and second tracks is the same, resulting in a correlation coefficient (R) of 1. If the amplitude and/or shape of the first and second readback signals differ, then the signal pattern written to the first and second tracks is different, resulting in a correlation coefficient (R) of less than 1. The correlation coefficient (R) is compared to a threshold (e.g., 0.98). If the correlation coefficient (R) is greater than the threshold, the effective thermal spot size for the NFT is longer than the nT signal pattern used to generate the signal pattern. If the correlation coefficient (R) is not greater than the threshold, the effective thermal spot size for the NFT is shorter than the nT signal pattern used to generate the signal pattern.

Referring to block 712, if the correlation coefficient (R) is greater than the threshold, the processes of blocks 702-710 are repeated by increasing the pattern length by 1T until the correlation coefficient (R) is less than the threshold. When the correlation coefficient (R) is less than the threshold at block 714, it is determined at block 716 that the previous pattern length represents the effective thermal spot size. For example, the second to last iteration of block 714 may result in increasing the signal pattern length from 4T to 5T. It is assumed that at 4T, the correlation coefficient (R) is greater than the threshold. At 5T (last iteration), however, it may be determined that the correlation coefficient (R) is less than the threshold. As such, the effective thermal spot size determined at block 716 is the previous pattern length, 4T. The processes at block 714 seek to increase the signal pattern length until the signal pattern length produces a correlation coefficient (R) that is less than the threshold.

Referring again to block 712, if the correlation coefficient (R) is not greater than the threshold, the processes of blocks 702-710 are repeated by reducing the signal pattern length by 1T until the correlation coefficient (R) is greater than the threshold. When the correlation coefficient (R) is greater than the threshold, it is determined at block 720 that the current pattern length represents the effective thermal spot size. For example, the last iteration of block 718 may result in reducing the signal pattern length from 5T to 4T. It is assumed that at 5T, the correlation coefficient (R) is less than the threshold, and that at 4T the correlation coefficient (R) is greater than the threshold. As such, the effective thermal spot size determined at block 720 is the current pattern length, 4T. The processes at block 718 seek to reduce the signal pattern length until the signal pattern length produces a correlation coefficient (R) that is greater than the threshold. It is noted that the computations performed in FIG. 7 may be implemented by the preamp 632, the write control circuit 635, or other processor, controller or logic circuit of the R/W channel 630 (see FIG. 6D).

As was previously discussed, the effective thermal spot size will vary across the stroke as a function of radius between the outer diameter (OD) and the inner diameter (ID) of the disc. For HAMR, the effective thermal spot size is a function of laser power and velocity of the disc. According to various embodiments, the effective thermal spot size can be measured on a per-head basis and across the stroke between the OD and ID of the disc. For example, the effective thermal spot size can be measured for pre-selected zones from the OD to the ID of the disc which takes into consideration the effect of laser power. Measuring the ETSS for pre-selected zones reduces test time. Also, there may be little difference in the ETSS among adjacent zones, such that many zones can share one ETSS. For example, one ETSS can be used for all data zones rather than pre-selected zones in some embodiments. Each of these measurements can be stored in a memory of the HAMR HDD and recalled when writing data to the disc.

Figure 8:
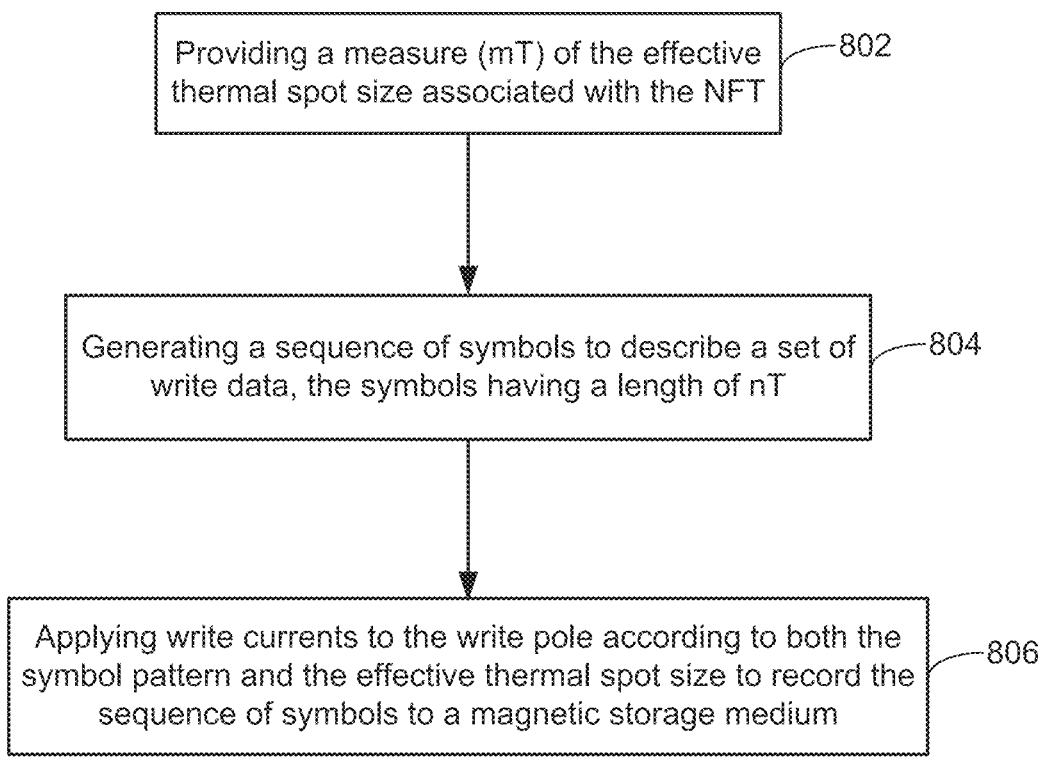
FIG. 8 illustrates a method for enhancing write current switching efficiencies during data write operations using the effective size of a thermal spot produced by an NFT of a HAMR writer in accordance with various embodiments.
Figure 9:
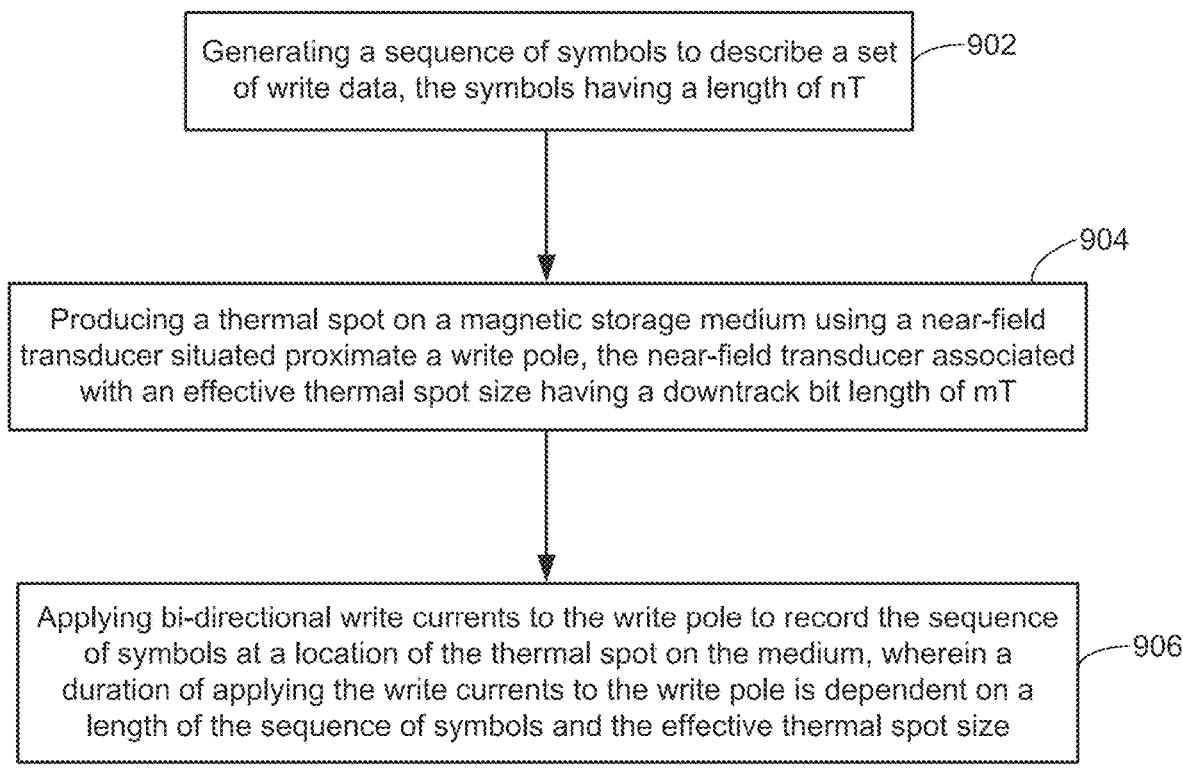
FIG. 9 illustrates a method for enhancing write current switching efficiencies during data write operations using the effective size of a thermal spot produced by an NFT of a HAMR writer in accordance with various embodiments.
Figure 10:
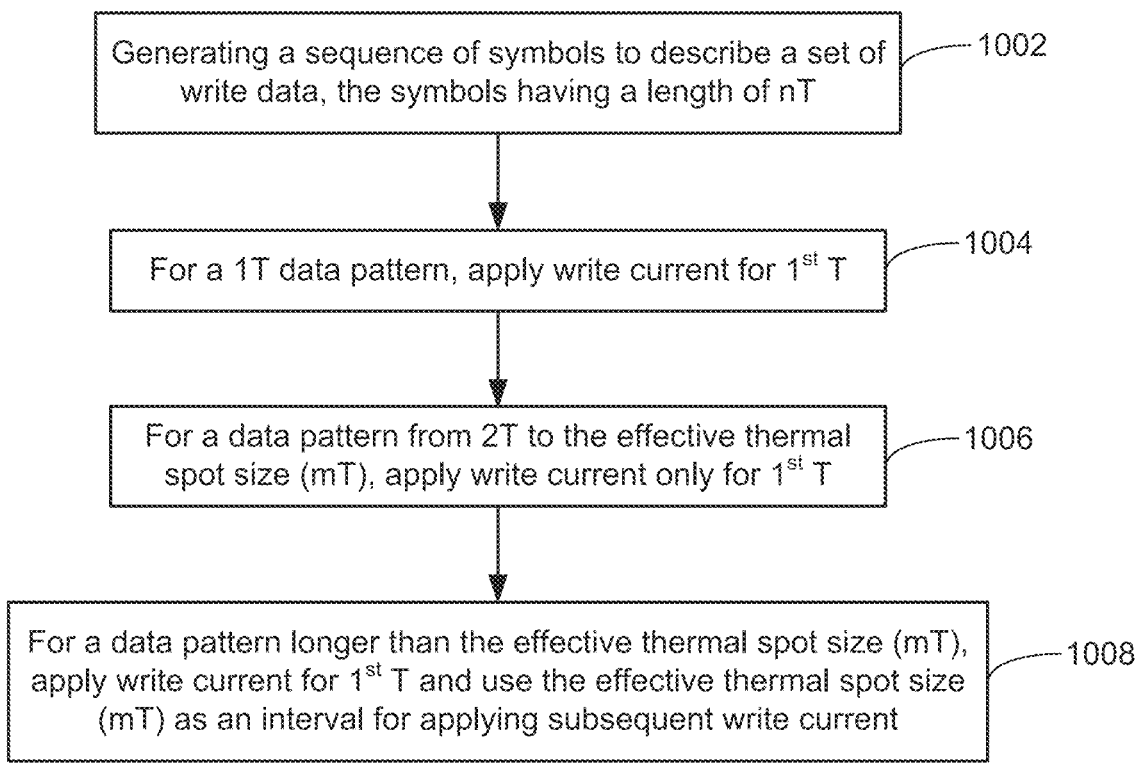
FIG. 10 illustrates a method for enhancing write current switching efficiencies during data write operations using the effective size of a thermal spot produced by an NFT of a HAMR writer in accordance with various embodiments.

FIGS. 8-10 illustrates methods for enhancing write current switching efficiencies during data write operations using the effective thermal spot size associated with an NFT of a HAMR writer in accordance with various embodiments. The method shown in FIG. 8 involves providing 802 a measure (mT, where m is an integer) of the effective size of the thermal spot produced by the NFT. The ETSS measurement may be obtained using the methodology shown in FIG. 7 for a particular HAMR head and zone on the disc. The method also involves generating 804 a sequence of symbols to describe a set of write data. Each of the symbols has a length of nT, where T is a channel clock rate and n is an integer over a predetermined range. The method further involves applying 806 write currents to the write pole according to both the symbol pattern and the effective thermal spot size to record the sequence of symbols to a magnetic storage medium configured for HAMR. According to some embodiments, applying a write current comprises applying a write current and an overshoot for the $1^{st}$ T of each symbol.

FIG. 9 illustrates a method for enhancing write current switching efficiencies during data write operations using the effective thermal spot size associated with an NFT of a HAMR writer in accordance with various embodiments. The method shown in FIG. 9 involves generating 902 a sequence of symbols to describe a set of write data. Each of the symbols has a length of nT, where T is a channel clock rate and n is an integer over a predetermined range. The method also involves producing 904 a thermal spot on a magnetic storage medium using a near-field transducer situated proximate a write pole of a HAMR slider, the near-field transducer associated with an effective thermal spot size having a downtrack bit length of mT, where m is an integer. The method further involves applying 906 bi-directional write currents to the write pole to record the sequence of symbols at a location of the thermal spot on the medium, wherein a duration of applying the write currents to the write pole is dependent on a length of the sequence of symbols and the effective thermal spot size.

Figure 12:
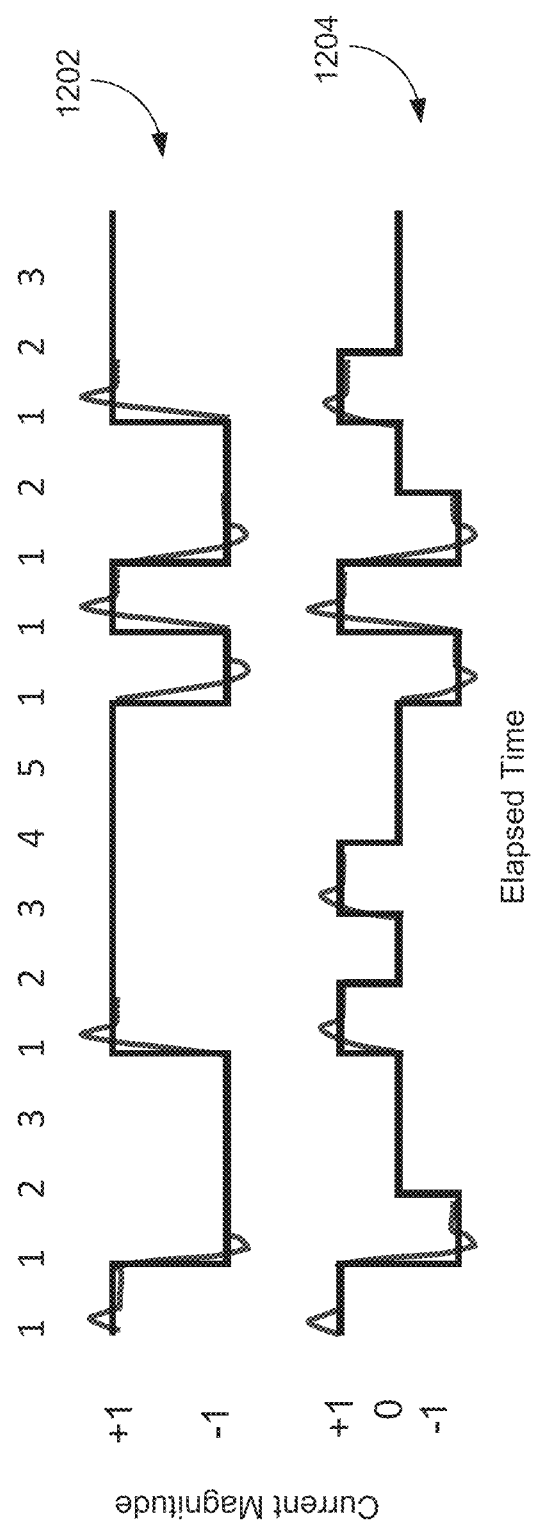
FIG. 12 is a graphical representation of two different write current command signals, wherein the upper signal is representative of a conventional write current command signal and the lower signal is representative of a write current command signal generated in accordance with various embodiments.

FIG. 10 illustrates a method for enhancing write current switching efficiencies during data write operations using the effective thermal spot size of a write pole in accordance with various embodiments. The method shown in FIG. 10 involves generating 1002 a sequence of symbols to describe a set of write data. Each of the symbols has a length of nT, where T is a channel clock rate and n is an integer over a predetermined range. According to the embodiment shown in FIG. 10, the application of write currents to the write pole is dependent on the length of the data pattern relative to the length of the effective thermal spot size. For a 1T data pattern, write current is applied 1004 for the $1^{st}$ T. For a data pattern having a length from 2T to the effective thermal spot size (mT), write current is applied 1006 only for the $1^{st}$ T. For example, no current (or the intermediate current) is applied after the $1^{st}$ T. For a data pattern that is longer than the effective thermal spot size (mT), write current is applied 1008 for the $1^{st}$ T and the effective thermal spot size (mT) is used as an interval for applying a subsequent write current(s). FIG. 12, for example, illustrates a representative approach for using the effective thermal spot size as an interval for applying a subsequent write current when writing data patterns longer than the ETSS. According to some embodiments, applying a write current comprises applying a write current and an overshoot for the $1^{st}$ T of each symbol.

Figure 11:
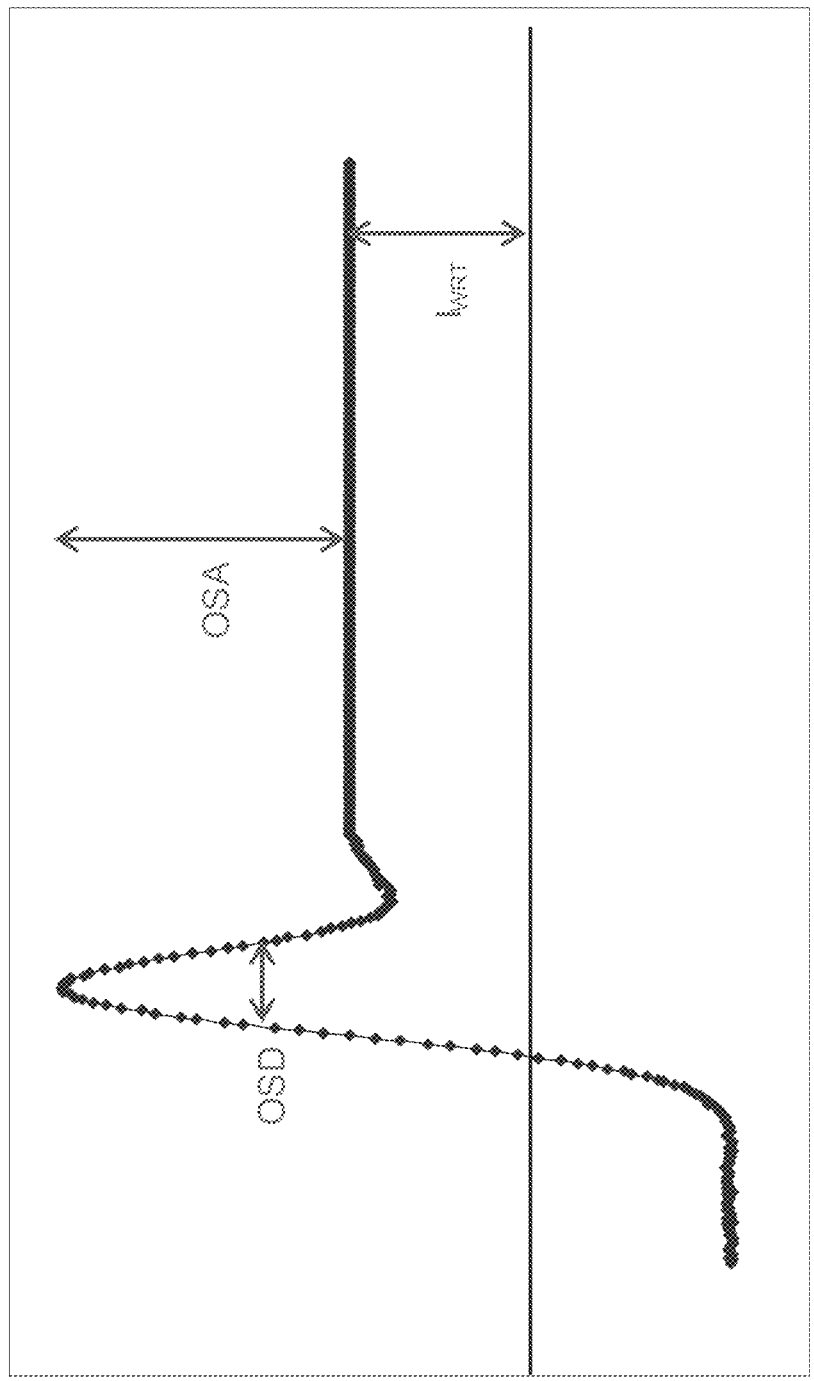
FIG. 11 illustrates a representative write triplet in accordance with various embodiments.

According to various embodiments, writing data patterns of various lengths involves writing so-called "write triplets" to the disc. FIG. 11 illustrates a representative write triplet. The write triplet shown in FIG. 11 includes three components: an overshoot duration (OSD), an overshoot amplitude (OSA), and a write current ($I_{WRT}$). In general, a write triplet is written at each transition (symbol boundary). A write triplet is also written at each positive or negative excursion from the intermediate (e.g., zero) current value for symbols longer than the ETSS. In some cases, a write triplet is written at the positive and negative excursions from the intermediate (e.g., zero) current value for symbols longer than the ETSS.

FIG. 12 is a graphical representation of two different write current command signals 1202 and 1204. Signal 1202 is representative of a conventional write current command signal and signal 1204 is representative of a write current command signal generated in accordance with various embodiments. The signals 1202, 1204 represent a data pattern comprising symbols with different lengths to be written to a disc. For purposes of illustration, FIG. 12 shows the application of an overshoot for the $1^{st}$ T of each symbol superimposed on the write current signal.

The signals 1202, 1204 are plotted against an elapsed time x-axis and a combined current magnitude y-axis. The signals 1202, 1204 can take the form of extended frequency modulated (EFM) signals with alternating levels from −1 to +1 and signal transitions at symbol boundaries. Seven (7) symbols having lengths of 1T, 3T, 5T, 1T, 1T, 2T, and 3T are shown for purposes of illustration, although other symbol lengths can be used as desired. For purposes of illustration, the signals 1202, 1204 represent write current command signals generated by a HAMR writer having an effective thermal spot size of 3T. It is noted that data can be written to a disc according to the methodologies illustrated in FIGS. 8-10 using the write current command signal 1204.

Using a conventional writing approach for generating the signal 1202, a full rail-to-rail current switching operation would be required to transition between each adjacent pairs of symbols. While operable, it has been found that switching the write current between the $I_{MIN}$ and $I_{MAX}$ current rails can require a relatively significant amount of rise time and settle time as the current direction is switched over the full range between the respective rails (e.g., from −25 mA to +25 mA and vice versa). This can provide an upper limit to the smallest achievable symbol size based on the non-instantaneous response characteristics of the circuit.

In contrast to signal 1202, the write command signal 1204 is generated according to the methodology shown in FIGS. 8-10. More particularly, for a 1T data pattern shown in FIG. 12, the write command signal 1204 provides for write current to be applied to the write pole for the $1^{st}$ T. For a data pattern having a length from 2T to the effective thermal spot size (e.g., 3T) shown in FIG. 12, the write command signal 1204 provides for write current to be applied to the write pole only for the $1^{st}$ T. For example, no current (or the intermediate current of 0 mA) is applied after the $1^{st}$ T. For a data pattern that is longer than the effective thermal spot size (e.g., see the 5T data pattern in FIG. 12 which is longer than the ETSS of 3T), the write command signal 1204 provides for write current to be applied to the write pole for the $1^{st}$ T and the effective thermal spot size (e.g., 3T) is used as an interval for applying a subsequent write current(s). As is shown in FIG. 12, the write command signal 1204 includes a write current signal and an overshoot for the $1^{st}$ T of each symbol.

As can be seen in FIG. 12, various embodiments configure the HAMR storage device to provide intermediate current values, or levels, immediately after the $1^{st}$ T of each symbol longer than 1T. For symbols longer than the effective thermal spot size, intermediate current levels are provided for at least the last m−1 bits, where mT is the effective thermal spot size. The intermediate (reduced or zero) current values are between the respective rail current values levels $I_{MAX}$ and $I_{MIN}$. For signal 1204 shown in FIG. 12, the intermediate current level is 0 mA. The intermediate current level can be any suitable value between the respective rail currents. In some embodiments, the $I_{MAX}$ and $I_{MIN}$ values are nominally about ±25 mA and the intermediate value is nominally about 0 mA. The EFM signal 1204 can thus be considered as a tri-state signal with three logical values −1 ($I_{MIN}$), 0 (intermediate value), and +1 ($I_{MAX}$). The intermediate current values at the end of each symbol reduce the overall current swing necessary for the next symbol boundary (e.g., from nominally 50 mA to about half that, or about 25 mA). Using one or more intermediate values as represented in FIG. 12 can provide significantly faster current switching and higher data recording densities.

With reference again to FIG. 6D, the R/W channel 630 includes a write control circuit 635 configured to provide write command signals to the write driver 640 (FIG. 6E) so that the write driver outputs respective rail current and intermediate values through the write coil. In some embodiments, a tri-state EFM signal (see signals 1204 in FIG. 12) is generated so that the intermediate values are received by the write driver 640 as commands for zero (or some other suitable intermediate value) of current. Other control mechanisms can be utilized, such as enable/disable signals which are provided in addition to a "conventional" EFM signal with conventional full-rail transitions. The enable/disable signals can operate to temporarily disengage further outputting of current by the write driver 640.

The write control circuit 635 can be realized in hardware or software, or can involve functionality supplied by the controller 602 (FIG. 6A) as required. In some cases, the circuit 635 analyzes the generated symbol sequence in the input encoded data stream and interjects intermediate values as required to form a modified symbol sequence which is then output to the write driver 640. In other embodiments, conventional input data sequences can be supplied to the preamp 644 (FIG. 6D) and the preamp 644 can be provided with internal circuitry that performs these functions. The length of the applied intermediate value (e.g., one bit, multiple bits) can be the same for all symbol lengths >1T, or the length can vary for different lengths of symbols.

The embodiments discussed below are directed to a thermal spot-dependent write method and apparatus for HAMR devices, such as HAMR HDDs. Two significant HAMR design challenges are reliability and aerial density capability (ADC). The most prevalent failure modes in a HAMR HDD are related to high NFT peg temperatures. As such, NFT peg temperature reduction is important for increasing wPOH (Write Power-On Hours) and improving reliability. Regarding ADC, HAMR HDD track width depends on the media heating. The more the laser heats the media, the wider the track pitch and/or the larger adjacent track interference (ATI) and adjacent track erasure (ATE) become, which results in a lowering of track density (kTPI) and ADC. A thermal spot-dependent write method and apparatus in accordance with various embodiments advantageously provide for a reduction in NFT peg temperature and a reduction in ATI/ATE impact on HAMR drive performance.

Figure 13A:
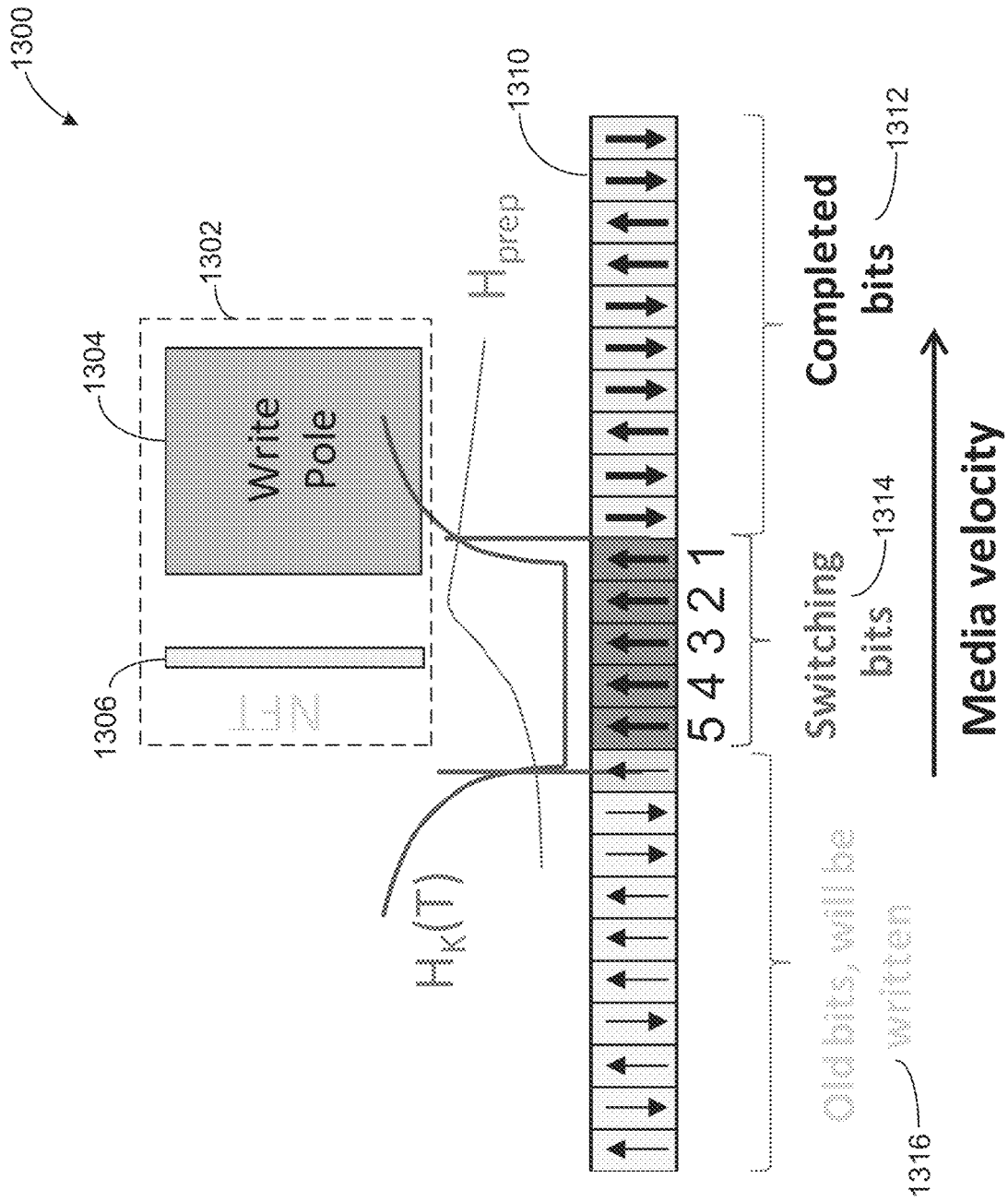
FIGS. 13A and 13B illustrate a thermal spot-dependent write apparatus and methodology for a HAMR device in accordance with various embodiments.
Figure 13B:
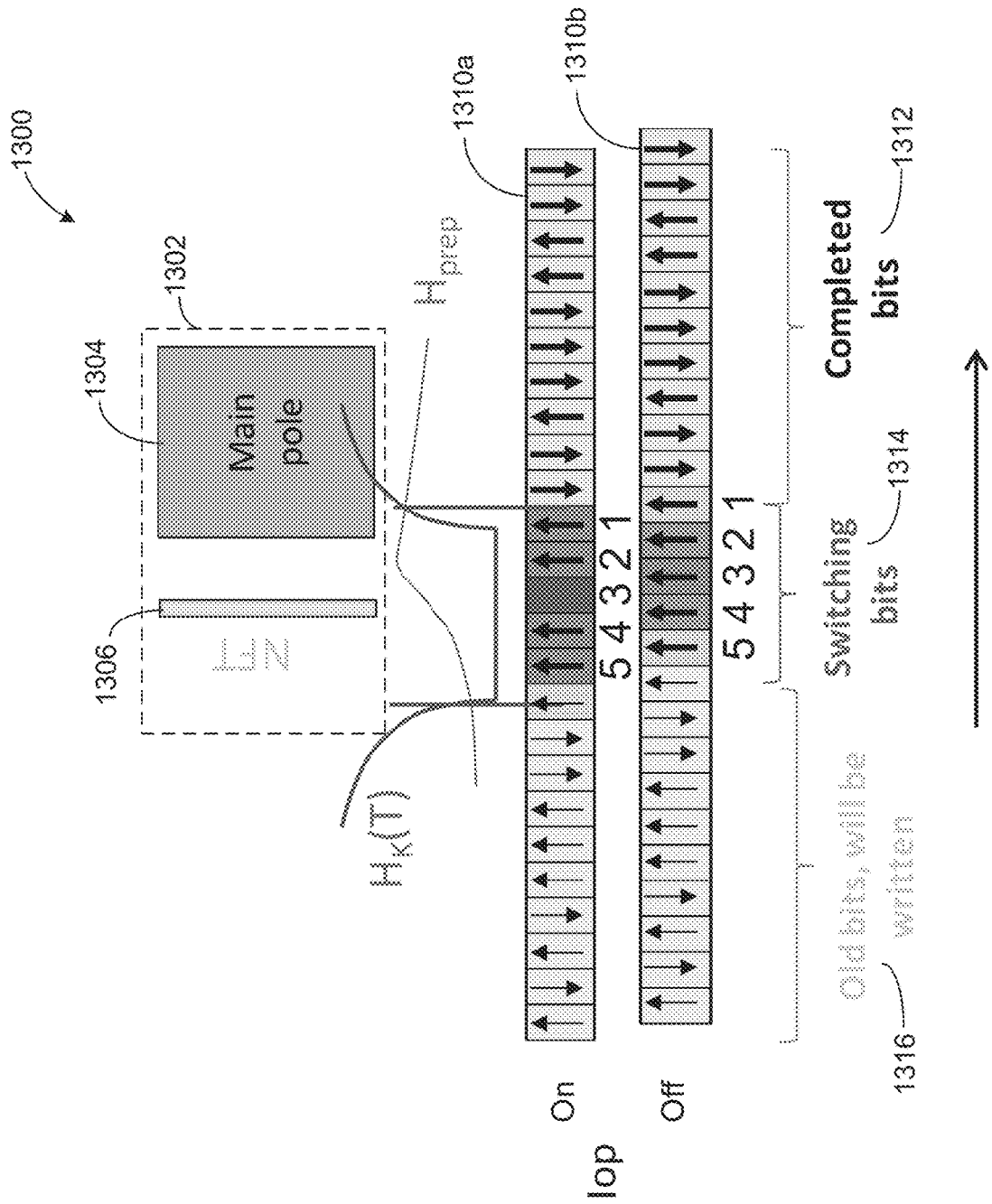

Referring now to FIGS. 13A and 13B, there is shown a portion of a HAMR data storage device 1300 including a slider 1302 which includes a write pole 1304 and an NFT 1306. As shown, the slider 1302 is positioned adjacent a recording surface of a magnetic recording medium 1310. Given the direction of media velocity shown, the magnetic recording medium 1310 includes completed bits 1312, switching bits 1314, and old bits 1316 that will be overwritten. The slider 1302 is shown positioned over the switching bits 1314.

In a HAMR HDD (e.g., HAMR data storage device 1300), and as previously discussed, the effective recording length in the down track direction (referred to as the ETSS in terms of number of bits or T) is determined by media coercivity $H_k(T)$ at the media hotspot and the magnetic field of the write pole, $H_{prep}$, as is shown in FIGS. 13A and 13B. The ETSS can be a few bits long. In the example shown in FIGS. 13A and 13B, the ETSS is 5× longer than a single bit. In other words, 5 bits are switched at the same time. It is noted that, in some cases, "bit 3" may not be flipped properly due to being too hot, which will be discussed below with reference to FIG. 13B. A thermal spot-dependent write methodology of the present disclosure uses the ETSS and data length to determine how long laser operation power (Iop) is applied to a laser source (e.g., a laser diode) when writing a set of write data to the magnetic recording medium 1310. The thermal spot-dependent write methodology reduces the amount of time Iop is applied to the laser source during a write operation relative to a conventional writing scheme, which advantageously reduces NFT peg temperature, thereby reducing the ATI/ATE impact.

As discussed previously, the effective size of the thermal spot produced by the NFT corresponds to the number of bits that are concurrently magnetized to the desired magnetization orientation at a location of the thermal spot when a write current is applied to the write pole. For example, an NFT associated with an effective thermal spot size of 3T will concurrently magnetize 3 bits to the desired magnetization orientation when a write current is applied to the write pole. According to various embodiments, the effective thermal spot size and the length of the symbol to be written are used to determine when and how long laser operation power, Iop, is applied to the laser source. As was previously discussed, the size of the effective thermal spot will vary from NFT to NFT (e.g., head to head). Moreover, the size of the effective thermal spot will vary across the stroke as a function of radius between the outer diameter (OD) and the inner diameter (ID) of the disc.

Figure 14:
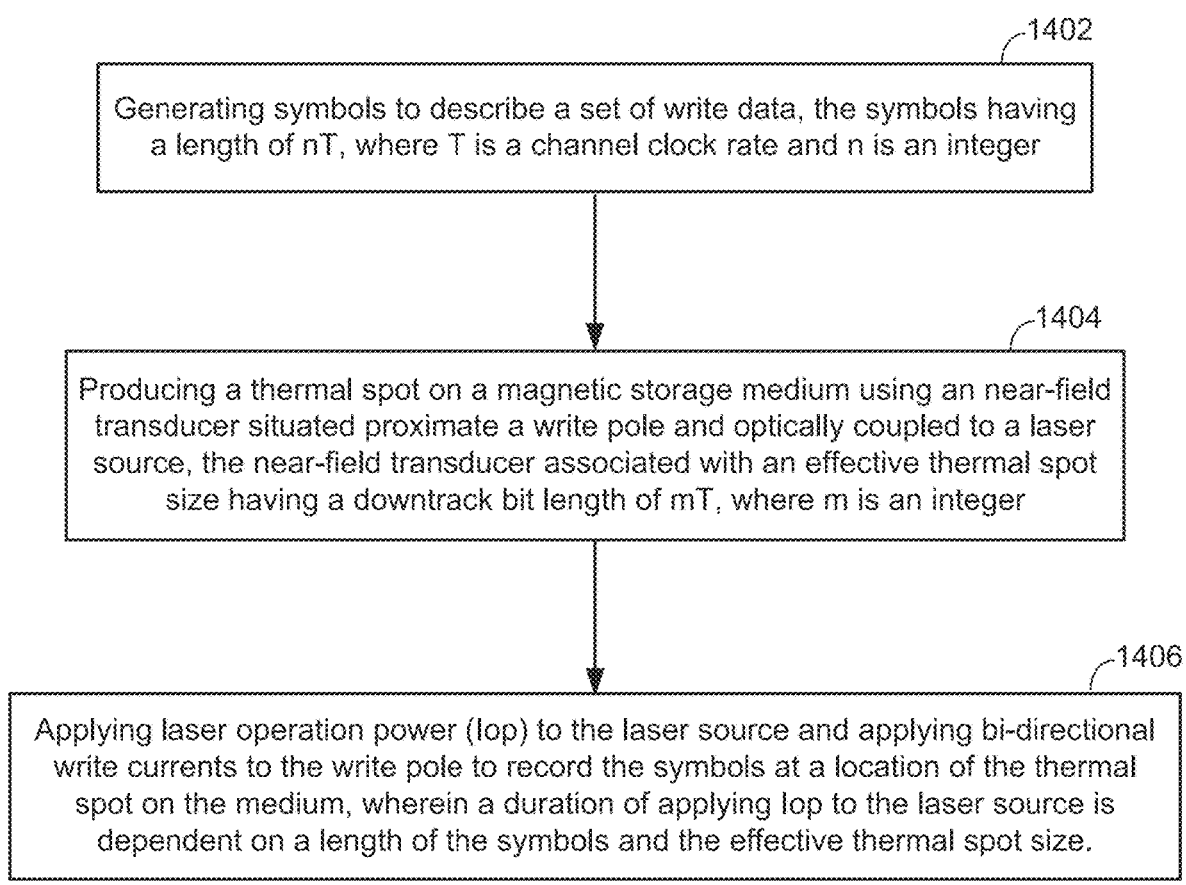
FIG. 14 illustrates a thermal spot-dependent write methodology for a HAMR device in accordance with various embodiments.

FIG. 14 illustrates a thermal spot-dependent write methodology for a HAMR device in accordance with various embodiments. The method shown in FIG. 14 involves generating 1402 symbols to describe a set of write data. The symbols have a length of nT, where T is a channel clock rate and n is an integer. The method also involves producing 1404 a thermal spot on a magnetic storage medium using a near-field transducer situated proximate a write pole and optically coupled to a laser source. The near-field transducer is associated with an effective thermal spot size having a down track bit length of mT, where m is an integer. The method further involves applying 1406 laser operation power, Iop, to the laser source and applying bi-directional write currents to the write pole to record the symbols at a location of the thermal spot on the medium. A duration of applying laser operation power, Iop, to the laser source is dependent on a length of the symbols and the effective thermal spot size. It is noted that the effective thermal spot size can be measured in a manner previously discussed.

Figure 15:
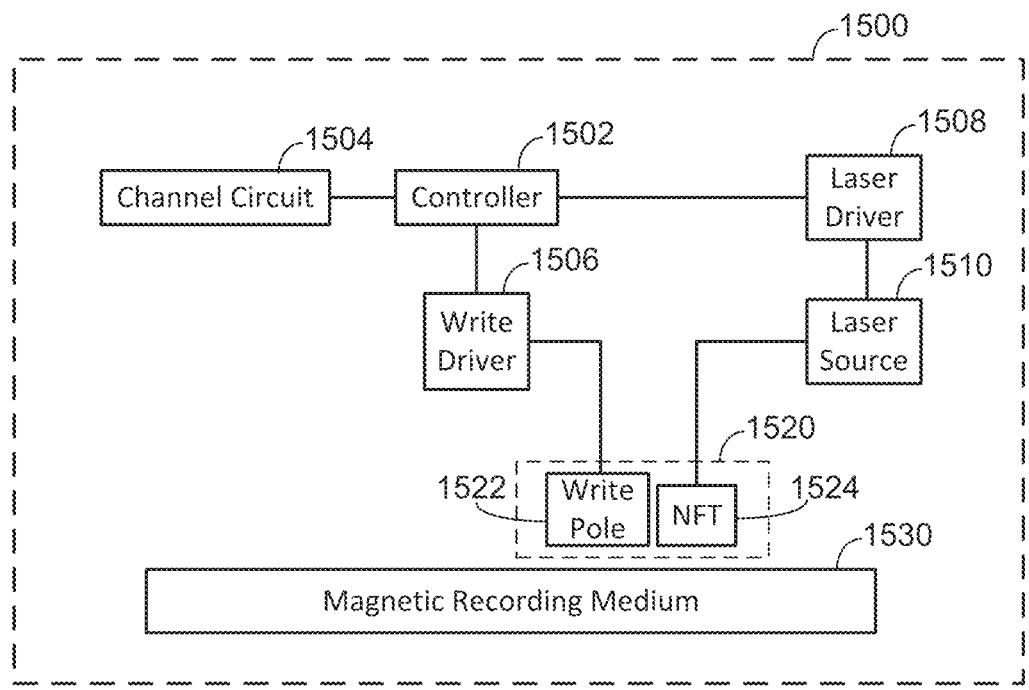
FIG. 15 is a block diagram of an apparatus configured to implement a thermal spot-dependent methodology in accordance with various embodiments.

FIG. 15 is a block diagram of an apparatus configured to implement a thermal spot-dependent methodology in accordance with various embodiments. For example, the apparatus 1500 shown in FIG. 15 can be configured to implement the method shown in FIG. 14. The apparatus 1500 includes a controller 1502 operatively coupled to a channel circuit 1504, a write driver 1506, and a laser driver 1508. The laser driver 1508 is coupled to a laser source 1510, such as a laser diode. The apparatus 1500 also includes a HAMR slider 1520 which includes a write pole 1522 situated proximate an NFT 1524. The NFT 1524 is associated with an effective thermal spot size having a downtrack bit length of mT, where m is an integer. The write pole 1522 is operatively coupled to the write driver 1506, and the NFT 1524 is optically coupled to the laser source 1510 (e.g., via an optical waveguide of the slider 1520). The slider 1520 is shown situated adjacent a recording surface of a magnetic recording medium 1530.

According to some embodiments, the write pole 1522 is positionable adjacent the magnetic recording medium 1530 and configured to write data to the medium 1530. The NFT 1524 is optically coupled to the laser source 1510 and is situated proximate the write pole 1522. The NFT 1524 is configured to produce a thermal spot on the medium 1530. The laser driver 1508 is configured to apply laser operation power, Iop, to the laser source 1510. The channel circuit 1504 is configured to generate symbols having a length of nT, where T is a channel clock rate and n is an integer. The laser driver 1508 is configured to apply laser operation power, Iop, to the laser source 1510 and the write driver 1506 is configured to apply bi-directional write currents to the write pole 1522 to record the symbols at a location of the thermal spot on the medium 1530. A duration of applying laser operation power, Iop, to the laser source 1510 by the laser driver 1508 is dependent on a length of the symbols and the effective thermal spot size.

Figure 16A:
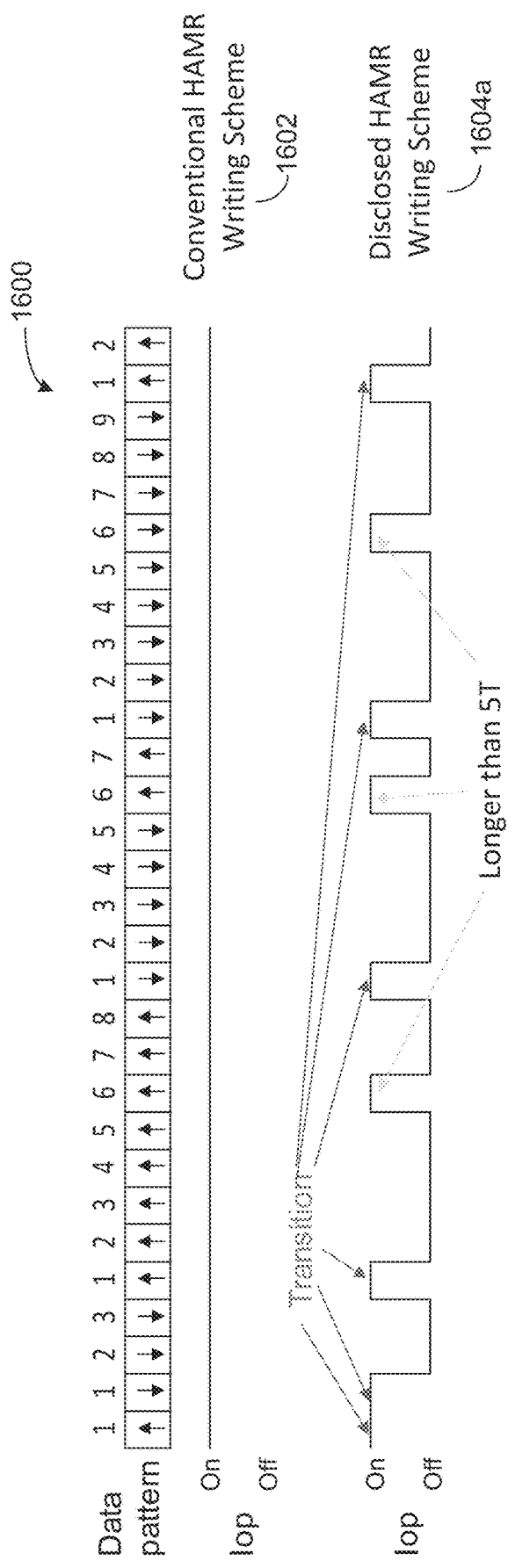
FIGS. 16A and 16B illustrate aspects of a thermal spot-dependent write methodology according to various embodiments relative to a conventional HAMR writing scheme.
Figure 16B:
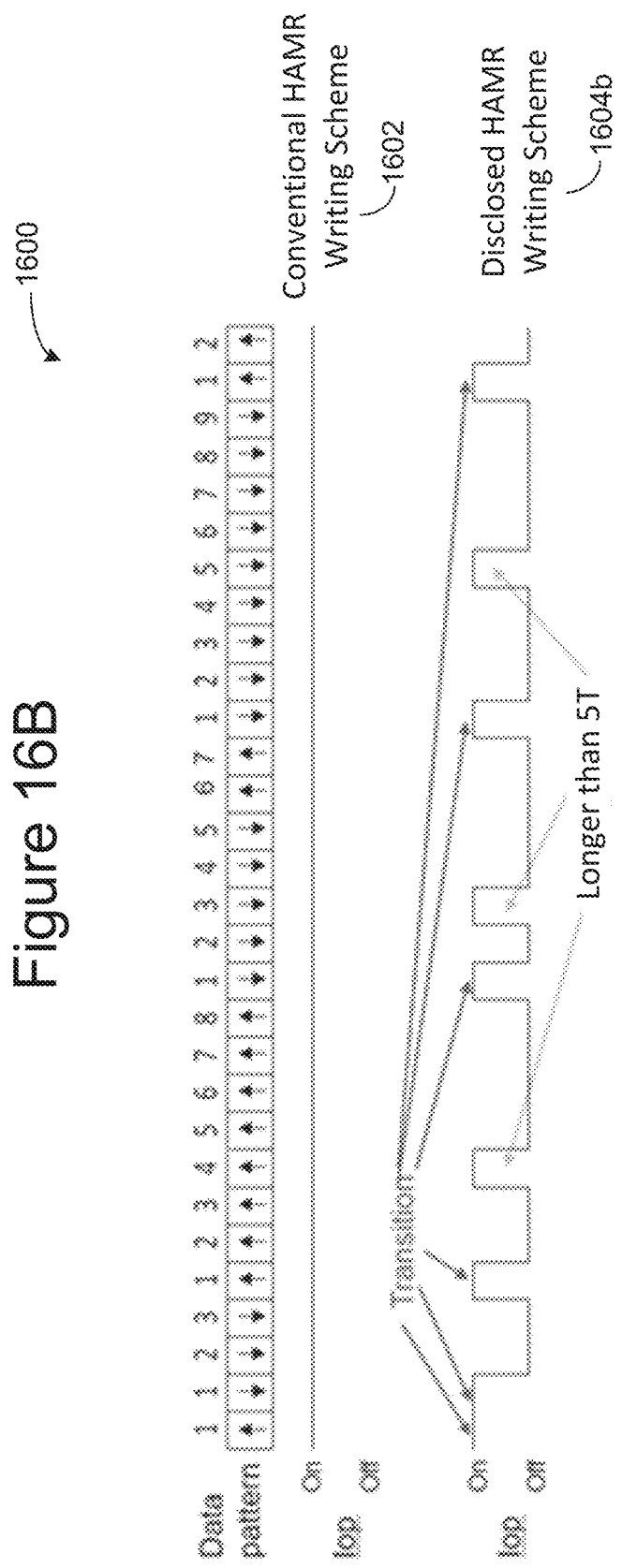

FIGS. 16A and 16B illustrate aspects of a thermal spot-dependent HAMR writing methodology of the present disclosure relative to a conventional HAMR writing scheme. FIGS. 16A and 16B show a data pattern 1600 comprising symbols of varying length, T. The effective thermal spot size in the representative example shown in FIGS. 16A and 16B is assumed to be 5T in length.

When writing the data pattern 1600 to a magnetic recording medium using a conventional HAMR writing scheme 1602, laser operation power, Iop, is applied to the laser source during the entire write operation. It can be appreciated that the continuous application of laser operation power, Iop, to the laser source during the entire write operation in accordance with a conventional HAMR writing scheme 1602 results in a significant elevation in NFT peg temperature. In contrast, a thermal spot-dependent HAMR writing methodology of the present disclosure, such as the disclosed HAMR writing schemes 1604a and 1604b shown in FIGS. 16A and 16B, advantageously results in a reduction of laser operation power, Iop, applied to the laser source when writing the data pattern 1600 to the magnetic recording medium (and, therefore, results in a significant reduction in NFT peg temperature).

In accordance with various embodiments, the timing and duration of laser operation power, Iop, applied to the laser source when writing data patterns of varying length can be implemented as follows:

Length of 1T: apply Iop to the laser source using a first write scheme
Length of 2T to the ETSS: apply Iop to the laser source using a second write scheme
Length >ETSS: apply Iop to the laser source using a third write scheme As can be seen above, different writing schemes involving the application of Iop to the laser source are implemented based on the relationship between the length of the data pattern to be written and the effective thermal spot size.

According to some embodiments, the following writing schemes can be implemented based on the effective thermal spot size and the length T of the data pattern to be written. For a 1T data pattern, the first scheme involves applying Iop to the laser source for the $1^{st}$ T. For a data pattern having a length from 2T to the ETSS, Iop is applied to the laser source only for the $1^{st}$ T. No laser operation power, Iop, is applied after the $1^{st}$ T for a data pattern having a length from 2T to the ETSS. For a data pattern having a length >ETSS, the ETSS is used as an interval for applying Iop. FIG. 16A illustrates the application and removal of Iop to/from the laser source relative to transitions in the data pattern 1600 and when using ETSS as an interval for applying Iop (see Longer than 5T events using the disclosed HAMR writing scheme 1604a). FIG. 16B is a variant of the disclosed HAMR writing scheme shown in FIG. 16A, in that Iop is applied to the laser source one bit prior to a transition at a symbol boundary (see disclosed HAMR writing scheme 1604b).

In accordance with some embodiments, a thermal spot-dependent methodology can deviate from the representative examples discussed above. For example, the laser driver can be configured to apply Iop to the laser source at least one bit (e.g., 1 bit) prior to a transition at a symbol boundary (e.g., see FIG. 16B). By way of further example, the write driver can be configured to withhold application of bi-directional write currents to the write pole for some data patterns (e.g., one or more predetermined sets of write data) to reduce one or both of adjacent track interference and adjacent track erasure (ATI/ATE).

Referring again to FIGS. 13A and 13B, FIG. 13A shows that 5 bits are switched at the same time. As previously noted, in some cases, "bit 3" may not be flipped properly due to being too hot, as is depicted in data FIG. 13B (see 1310a). However, improper flipping of "bit 3" does not affect the effective thermal spot size. Consider the following scenario:

If the data pattern is 1T, whether "bit 3" is flipped or not will not affect the 1T data pattern
If the data pattern is 2T or longer, no Iop is applied for "bit 2." As such, the "bit 3" location will cool down and it is still under the writer magnetic field (e.g., the writer magnetic footprint is much longer than media thermal spot), so it will be flipped properly (see 1310b).

Systems, devices or methods disclosed herein may include one or more of the features structures, methods, or combination thereof described herein. For example, a device or method may be implemented to include one or more of the features and/or processes above. It is intended that such device or method need not include all of the features and/or processes described herein, but may be implemented to include selected features and/or processes that provide useful structures and/or functionality.

Various modifications and additions can be made to the disclosed embodiments discussed above. Accordingly, the scope of the present disclosure should not be limited by the particular embodiments described above, but should be defined only by the claims set forth below and equivalents thereof.

What is claimed is:

1. A method, comprising:
generating symbols to describe a set of write data;
producing a thermal spot on a magnetic storage medium using a near-field transducer of a heat-assisted magnetic recording slider, the near-field transducer associated with an effective thermal spot size; and
applying laser operation power (Iop) to the laser source and applying write currents to a write pole of the slider at a location of the thermal spot on the medium, wherein a duration of applying Iop to the laser source is dependent on a length of symbols to be written to the medium and the effective thermal spot size.

2. The method of claim 1, wherein applying Iop to the laser source comprises applying Iop to the laser source using the effective thermal spot size as an interval when recording symbols having a length longer than mT to the medium, where m is an integer greater than or equal to 2 and T is a channel clock rate.

3. The method of claim 1, wherein applying Iop to the laser source comprises:
applying Iop to the laser source according to a first write scheme for a symbol having a length of 1T, where T is a channel clock rate;
applying Iop to the laser source according to a second write scheme for a symbol having a length of 2T to the effective thermal spot size; and
applying Iop to the laser source according to a third write scheme for a symbol having a length greater than the effective thermal spot size.

4. The method of claim 1, wherein applying Iop to the laser source comprises:
for a symbol having a length of 1T, applying Iop to the laser source at a $1^{st}$ T of the symbol, where T is a channel clock rate;
for a symbol having a length of 2T to the effective thermal spot size, applying Iop to the laser source only at a $1^{st}$ T of the symbol; and
for a symbol having a length greater than the effective thermal spot size, applying Iop to the laser source using the effective thermal spot size as an interval.

5. The method of claim 1, wherein applying Iop to the laser source comprises applying Iop to the laser source at least 1 bit prior to a transition at a symbol boundary.

6. The method of claim 1, wherein the application of write currents to the write pole is withheld for one or more predetermined sets of write data to reduce one or both of adjacent track interference and adjacent track erasure.

7. The method of claim 1, wherein the effective thermal spot size dictates a width of data tracks of the medium.

8. The method of claim 1, wherein the effective thermal spot size has a downtrack bit length of mT, where m is an integer greater than or equal to 2 and T is a channel clock rate.

9. The method of claim 1, wherein the effective thermal spot size has a downtrack bit length of mT, where m is an integer from 2 to 5 and T is a channel clock rate.

10. The method of claim 1, comprising measuring the effective thermal spot size.

11. An apparatus, comprising:
- a heat-assisted magnetic recording slider comprising a write pole configured to write data to a magnetic recording medium and a near-field transducer associated with an effective thermal spot size and configured to produce a thermal spot on the medium;
- a channel circuit configured to generate symbols describing a set of write data;
- a laser driver configured to apply laser operation power (Iop) to a laser source; and
- a write driver configured to apply write currents to the write pole;
- wherein the laser driver is configured to apply Iop to the laser source and the write driver is configured to apply write currents to the write pole to record the symbols at a location of the thermal spot on the medium, wherein a duration of applying Iop to the laser source by the laser driver is dependent on a length of the symbols and the effective thermal spot size.

12. The apparatus of claim 11, wherein applying Iop to the laser source by the laser driver comprises applying Iop to the laser source using the effective thermal spot size as an interval when recording symbols having a length longer than mT to the medium, where m is an integer greater than or equal to 2 and T is a channel clock rate.

13. The apparatus of claim 11, wherein applying Iop to the laser source by the laser driver comprises:
- applying Iop to the laser source according to a first write scheme for a symbol having a length of 1T, where T is a channel clock rate;
- applying Iop to the laser source according to a second write scheme for a symbol having a length of 2T to the effective thermal spot size; and
- applying Iop to the laser source according to a third write scheme for a symbol having a length greater than the effective thermal spot size.

14. The apparatus of claim 11, wherein applying Iop to the laser source by the laser driver comprises:
- for a symbol having a length of 1T, applying Iop to the laser source at a $1^{st}$ T of the symbol, where T is a channel clock rate;
- for a symbol having a length of 2T to the effective thermal spot size, applying Iop to the laser source only at a $1^{st}$ T of the symbol; and
- for a symbol having a length greater than the effective thermal spot size, applying Iop to the laser source using the effective thermal spot size as an interval.

15. The apparatus of claim 11, wherein applying Iop to the laser source by the laser driver comprises applying Iop to the laser source at least 1 bit prior to a transition at a symbol boundary.

16. The apparatus of claim 11, wherein the write driver is configured to withhold application of write currents to the write pole for one or more predetermined sets of write data to reduce one or both of adjacent track interference and adjacent track erasure.

17. The apparatus of claim 11, wherein the effective thermal spot size dictates a width of data tracks of the medium.

18. The apparatus of claim 11, wherein the effective thermal spot size has a downtrack bit length of mT, where m is an integer greater than or equal to 2 and T is a channel clock rate.

19. The apparatus of claim 11, wherein the effective thermal spot size has a downtrack bit length of mT, where m is an integer from 2 to 5 and T is a channel clock rate.

20. The apparatus of claim 11, comprising circuitry configured to measure the effective thermal spot size associated with the near-field transducer.

* * * * *